US011665745B2

(12) United States Patent
Sengupta et al.

(10) Patent No.: US 11,665,745 B2
(45) Date of Patent: May 30, 2023

(54) NARROWBAND RANDOM ACCESS PREAMBLES FOR NON-TERRESTRIAL NETWORK COMMUNICATIONS

(71) Applicant: QUALCOMM Incorporated, San Diego, CA (US)

(72) Inventors: Ayan Sengupta, San Diego, CA (US); Xiao Feng Wang, San Diego, CA (US); Alberto Rico Alvarino, San Diego, CA (US); Peter Gaal, San Diego, CA (US); Liangping Ma, San Diego, CA (US); Le Liu, Fremont, CA (US); Jun Ma, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/364,230

(22) Filed: Jun. 30, 2021

(65) Prior Publication Data

US 2022/0015148 A1     Jan. 13, 2022

Related U.S. Application Data

(60) Provisional application No. 63/049,111, filed on Jul. 7, 2020.

(51) Int. Cl.
*H04W 74/08* (2009.01)
*H04W 74/00* (2009.01)
(Continued)

(52) U.S. Cl.
CPC .... *H04W 74/0833* (2013.01); *H04B 7/18576* (2013.01); *H04W 72/044* (2013.01); *H04W 74/006* (2013.01)

(58) Field of Classification Search
None
See application file for complete search history.

(56) References Cited

U.S. PATENT DOCUMENTS 10,554,293 B1 *  2/2020  Chin .................. H04B 7/18513
11,388,757 B2 *  7/2022  Qi ........................ H04B 7/1855
(Continued)

FOREIGN PATENT DOCUMENTS

| WO | WO-2019216706 A1 * | 11/2019 | ............. H04B 7/185 |
| WO | WO-2019231305 A1 | 12/2019 | |
| WO | WO-2019243206 A1 | 12/2019 | |

OTHER PUBLICATIONS

3GPP TR 38.821: "3rd Generation Partnership Project; Technical Specification Group Radio Access Network; Solutions for NR to Support Non-Terrestrial Networks (NTN) (Release16)", 3GPP Standard, Technical Report, 3GPP TR 38.821, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), pp. 1-140, XP051860814, Retrieved from the Internet: URL: http://ftp.3gpp.org/Specs/archive/38_series/38.821/38821-g00.zip 38821-g00.doc [Retrieved on Jan. 16, 2020] paragraphs [04.1], [6.3.4], [07.3], [09.2], para. 7.3. 1.1-7.3. 1.2, 7.3.1.3.2, para.8.1-8.2.2.2, p. 63, paragraph 6.2.4 p. 82, paragraph 7.2.1.2.1—p. 83, paragraph 7.2.1.2.1, p. 89, paragraph 7.3—p. 93, paragraph 7.3.1.7, section 1, section 5, section: 7. 2. 1. 1.
(Continued)

*Primary Examiner* — Faiyazkhan Ghafoerkhan
(74) *Attorney, Agent, or Firm* — Holland & Hart LLP

(57) ABSTRACT

Methods, systems, and devices for wireless communications are described in which random access preambles may be designed to provide for relatively low inter-carrier interference (ICI) of adjacent available frequency resources in a non-terrestrial network (NTN). Random access preambles
(Continued)

for NTN random access requests may be selected from a first set of random access preambles that are different from a second set of random access preambles for terrestrial random access requests. The first set of random access preambles may be a subset of the second set of random access preambles. The first set of random access preambles may be provided for contention-based random access (CBRA) and contention-free random access (CFRA) preambles may be configured by a base station from random access preambles that correspond to or are different from the second set of random access preambles.

30 Claims, 22 Drawing Sheets

(51) Int. Cl.
    *H04B 7/185*     (2006.01)
    *H04W 72/044*     (2023.01)

(56) References Cited

U.S. PATENT DOCUMENTS

| | | | |
|---|---|---|---|
| 2020/0413451 A1* | 12/2020 | Taherzadeh Boroujeni | H04W 74/0833 |
| 2021/0168872 A1* | 6/2021 | Qi | H04W 74/0833 |
| 2022/0015148 A1* | 1/2022 | Sengupta | H04W 74/006 |
| 2022/0272762 A1* | 8/2022 | Määttänen | H04W 72/51 |
| 2022/0295572 A1* | 9/2022 | Sedin | H04W 74/0841 |
| 2022/0353122 A1* | 11/2022 | Qi | H04B 7/1855 |

OTHER PUBLICATIONS

CATT: "PRACH Design and UL Timing Management", 3GPP TSG RAN WG1 Meeting #99, 3GPP Draft, R1-1912165, 3rd Generation Partnership Project (3GPP), Mobi Le Competence Centre, 650, Route Des Lucioles, F-06921 Sophia-Antipolis Cedex, France, vol. RAN WG1, No. Reno, USA, Nov. 18-Nov. 22, 2019, 5 Pages, Nov. 9, 2019 (Nov. 9, 2019), XP051823243, Retrieved from the Internet: URL: https://ftp.3gpp.org/tsg_ran/WG1_RL1/TSGR1_99/Docs/R1-1912165.zip R1-1912165.docx [retrieved on Nov. 9, 2019], the whole document.

International Search Report and Written Opinion—PCT/US2021/040122—ISA/EPO—dated Nov. 5, 2021(205883WO).

Nokia, et al., "Doppler Compensation, Uplink Timing Advance and Random Access in NTN," 3GPP Draft, 3GPP TSG RAN WG1 #99, R1-1913017, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18-Nov. 22, 2019, Nov. 9, 2019 (Nov. 9, 2019), XP051823750, 28 pages, Retrieved from the Internet: URL: https://ftp.3gpp.org/tsg_ran/WG1_RL1/TSGR1_99/Docs/R1-1913017.zip R1 -1913017.docx [retrieved on Nov. 9, 2019], the whole document.

* cited by examiner

NARROWBAND RANDOM ACCESS PREAMBLES FOR NON-TERRESTRIAL NETWORK COMMUNICATIONS

CROSS REFERENCE

The present application for patent claims the benefit of U.S. Provisional Patent Application No. 63/049,111 by SENGUPTA et al., entitled "NARROWBAND RANDOM ACCESS PREAMBLES FOR NON-TERRESTRIAL NETWORK COMMUNICATIONS," filed Jul. 7, 2020, assigned to the assignee hereof, and expressly incorporated by reference herein.

FIELD OF TECHNOLOGY

The following relates generally to wireless communications and more specifically to narrowband random access preambles for non-terrestrial network communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when one or more of a gateway, base station, or the UE are at a high altitude relative to one another (e.g., in a non-terrestrial network (NTN) or system with high altitude platform stations (HAPSs)). Because of the distance between wireless nodes in such cases, signal strength for communications may be relatively low, and there may be a relatively long round-trip delay or propagation delay in message transmissions (e.g., relative to terrestrial networks). Further, communications in such situations may experience relatively large amounts of Doppler shift due to relatively fast movement of nodes relative to one another. Efficient techniques for managing communications to enhance efficiency and reliability may thus be desirable for such systems.

SUMMARY

The described techniques relate to improved methods, systems, devices, and apparatuses that support narrowband random access preambles for non-terrestrial networks. In accordance with various aspects, random access preambles may be designed to provide for relatively low inter-carrier interference (ICI) for random access preambles that may be transmitted using adjacent available frequency resources in a non-terrestrial network (NTN). In some cases, random access preambles for NTN random access requests may be selected from a first set of random access preambles that may have parameters that are different from a second ret of random access preambles for terrestrial network random access messages. In some cases, the first set of random access preambles may facilitate uplink synchronization in the presence of larger frequency shifts in random access messages than the second set of random access preambles. In some cases, the first set of random access preambles may be a subset of the second set of random access preambles. For example, in some cases, an initial subcarrier for a random access preamble of the first set of random access preambles may be selected from a subset of a set of available initial subcarriers, where the second set of random access preambles may include all of the set of available initial subcarriers. In some cases, a subset of the first set of random access preambles may be provided for contention-based random access (CBRA) in NTN, and contention-free random access (CFRA) preambles may be configured by a base station from random access preambles that correspond to or are different from a subset of the second set of random access preambles.

A method of wireless communication at a UE is described. The method may include receiving, from a base station, configuration information for a first set of narrowband random access parameters corresponding to random access messages transmitted over a non-terrestrial network that is different from a second set of narrowband random access parameters for random access messages transmitted over a terrestrial network, selecting, based on the receiving, one or more narrowband random access parameters from the first set of narrowband random access parameters for a random access message to be transmitted to the base station via a satellite link of the non-terrestrial network, and transmitting the random access message to the base station via the satellite link using the selected narrowband random access parameters.

An apparatus for wireless communication at a UE is described. The apparatus may include a processor, memory coupled with the processor, and instructions stored in the memory. The instructions may be executable by the processor to cause the apparatus to receive, from a base station, configuration information for a first set of narrowband random access parameters corresponding to random access messages transmitted over a non-terrestrial network that is different from a second set of narrowband random access parameters for random access messages transmitted over a terrestrial network, select, based on the receiving, one or more narrowband random access parameters from the first set of narrowband random access parameters for a random access message to be transmitted to the base station via a satellite link of the non-terrestrial network, and transmit the random access message to the base station via the satellite link using the selected narrowband random access parameters.

Another apparatus for wireless communication at a UE is described. The apparatus may include means for receiving, from a base station, configuration information for a first set of narrowband random access parameters corresponding to random access messages transmitted over a non-terrestrial network that is different from a second set of narrowband random access parameters for random access messages transmitted over a terrestrial network, selecting, based on the receiving, one or more narrowband random access parameters from the first set of narrowband random access parameters for a random access message to be transmitted to the base station via a satellite link of the non-terrestrial network, and transmitting the random access message to the base station via the satellite link using the selected narrowband random access parameters.

A non-transitory computer-readable medium storing code for wireless communication at a UE is described. The code may include instructions executable by a processor to receive, from a base station, configuration information for a first set of narrowband random access parameters corresponding to random access messages transmitted over a non-terrestrial network that is different from a second set of narrowband random access parameters for random access messages transmitted over a terrestrial network, select, based on the receiving, one or more narrowband random access parameters from the first set of narrowband random access parameters for a random access message to be transmitted to the base station via a satellite link of the non-terrestrial network, and transmit the random access message to the base station via the satellite link using the selected narrowband random access parameters.

In some examples of the method, apparatuses, and non-transitory computer-readable medium described herein, the first set of narrowband random access parameters include a first set of starting subcarriers allocated for contention-based random access preambles and may be different from a second set of starting subcarriers allocated for contention-based random access preambles in the second set of narrowband random access parameters. In some examples of the method, apparatuses, and non-transitory computer-readable medium described herein, adjacent starting subcarriers of the first set of starting subcarriers may have a first frequency spacing that is larger than a second frequency spacing between adjacent starting subcarriers of the second set of starting subcarriers. In some examples of the method, apparatuses, and non-transitory computer-readable medium described herein, the first set of starting subcarriers allocated for contention-based random access preambles may have fewer available starting subcarriers per unit of frequency than the second set of starting subcarriers. In some examples of the method, apparatuses, and non-transitory computer-readable medium described herein, the first set of starting subcarriers may have a different range of starting subcarriers within a total number of available starting subcarriers for contention-based random access and contention-free random access than that of the second set of starting subcarriers.

In some examples of the method, apparatuses, and non-transitory computer-readable medium described herein, the first set of starting subcarriers corresponds to a subset of the second set of starting subcarriers. In some examples of the method, apparatuses, and non-transitory computer-readable medium described herein, the first set of starting subcarriers may be selected from the second set of starting subcarriers based on one or more of a starting subcarrier index value or a pattern of starting subcarriers from the second set of starting subcarriers. In some examples of the method, apparatuses, and non-transitory computer-readable medium described herein, the pattern of starting subcarriers includes one out of every m consecutive starting subcarriers from the second set of starting subcarriers, where m is an integer.

In some examples of the method, apparatuses, and non-transitory computer-readable medium described herein, the first set of starting subcarriers allocated for contention-based random access corresponds to a subset of a total number of available starting subcarriers allocated for contention-based and contention-free random access preambles in the second set of narrowband random access parameters, where the first set of starting subcarriers is determined at least in part by a pattern of starting subcarriers from the second set of starting subcarriers. In some examples of the method, apparatuses, and non-transitory computer-readable medium described herein, the pattern of starting subcarriers includes one out of every m consecutive starting subcarriers from the total number of available starting subcarriers in the second set of narrowband random access parameters, where m is an integer.

In some examples of the method, apparatuses, and non-transitory computer-readable medium described herein, the first set of narrowband random access parameters include a first set of random access preambles for contention-based random access that have one or more different characteristics than a second set of random access preambles of the second set of narrowband random access parameters. In some examples of the method, apparatuses, and non-transitory computer-readable medium described herein, the first set of random access preambles may have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles. In some examples of the method, apparatuses, and non-transitory computer-readable medium described herein, at least one intra-PRU hopping pattern provides that two random access preambles that are adjacent in frequency in a first portion of the PRU are non-adjacent in frequency in a second part of the PRU.

In some examples of the method, apparatuses, and non-transitory computer-readable medium described herein, the first set of random access preambles are configured from a first candidate set of random access preambles and the second set of random access preambles are configured from a second candidate set of random access preambles, where the first candidate set of preambles is a subset of the second candidate set of random access preambles. In some examples of the method, apparatuses, and non-transitory computer-readable medium described herein, one or more preamble formats, preamble subcarrier spacings, or any combinations thereof of the second candidate set of random access preambles are precluded from the first candidate set of random access preambles.

In some examples of the method, apparatuses, and non-transitory computer-readable medium described herein, the receiving the configuration information further may include operations, features, means, or instructions for receiving an indication of a first subset of the first set of narrowband random access parameters that provide resources corresponding to the first subset and a second subset of the first set of narrowband random access parameters that provide resources corresponding to the second subset, where the resources corresponding to the first subset have one or more parameters that are different than corresponding parameters of the second subset resources. In some examples of the method, apparatuses, and non-transitory computer-readable medium described herein, the resources corresponding to the first subset or the second subset are any one of contention-based random access resources or contention-free random access resources.

In some examples of the method, apparatuses, and non-transitory computer-readable medium described herein, the first subset of narrowband random access parameters use random access parameters that are not different from those of terrestrial random access messages and the second subset of narrowband random access parameters use random access parameters specific to non-terrestrial random access messages. In some examples of the method, apparatuses, and non-transitory computer-readable medium described herein, the random access parameters include one or more of a set of starting subcarrier indices, a frequency hopping pattern for random access preambles, a subcarrier spacing, a number of subcarriers spanned in frequency, or any combinations thereof.

In some examples of the method, apparatuses, and non-transitory computer-readable medium described herein, the resources corresponding to the first subset and the resources corresponding to the second subset are located in a same set of frequency resources and in different time resources, in different sets of frequency resources and a same set of time resources, in different frequency and time resources, or interlaced with each other within the same set of time and frequency resources. In some examples of the method, apparatuses, and non-transitory computer-readable medium described herein, a periodicity of the resources corresponding to the first subset are different from a periodicity of the resources corresponding to the second subset.

In some examples of the method, apparatuses, and non-transitory computer-readable medium described herein, the transmitting the random access message further includes transmitting one or more further random access messages over the satellite link according to a configuration for periodic contention-free random access preamble message transmissions. In some examples of the method, apparatuses, and non-transitory computer-readable medium described herein, the configuration for periodic contention-free random access resources is received from the base station in radio resource control signaling. In some examples of the method, apparatuses, and non-transitory computer-readable medium described herein, the configuration for periodic contention-free random access resources is activated based on activation signaling received in one or more of a medium access control (MAC) control element or a downlink control information communication from the base station. In some examples of the method, apparatuses, and non-transitory computer-readable medium described herein, the activation signaling includes information for adjustment of one or more parameters associated with the one or more further random access messages.

Some examples of the method, apparatuses, and non-transitory computer-readable medium described herein may further include operations, features, means, or instructions for receiving, from the base station, in response to the random access message, a physical layer downlink control information communication that provides one or more of a time or frequency correction command for communications via the satellite link. In some examples of the method, apparatuses, and non-transitory computer-readable medium described herein, the time or frequency correction command may be provided in the physical layer downlink control information when the indicated correction value is less than a threshold value, and where the time or frequency correction command is provided in a medium access control (MAC) control element when the indicated correction value meets or exceeds the threshold value.

In some examples of the method, apparatuses, and non-transitory computer-readable medium described herein, the first set of narrowband random access parameters supports different random access resource configurations associated with one or more repetitions of a preamble repetition unit (PRU) than the second set of narrowband random access parameters. In some examples of the method, apparatuses, and non-transitory computer-readable medium described herein, a maximum number of preamble repetitions supported by the first set of narrowband random access parameters is less than the maximum number of repetitions supported by the second set of narrowband random access parameters for at least a subset of random access preamble configurations.

A method of wireless communication at a base station is described. The method may include transmitting, to a UE, configuration information for a first set of narrowband random access parameters corresponding to random access messages transmitted over a non-terrestrial network that is different from a second set of narrowband random access parameters for random access messages transmitted over a terrestrial network, detecting one or more random access messages from the UE via a satellite link of the non-terrestrial network based on the first set of narrowband random access parameters, and transmitting a random access response to the UE via the satellite link responsive to the detecting.

An apparatus for wireless communication at a base station is described. The apparatus may include a processor, memory coupled with the processor, and instructions stored in the memory. The instructions may be executable by the processor to cause the apparatus to transmit, to a UE, configuration information for a first set of narrowband random access parameters corresponding to random access messages transmitted over a non-terrestrial network that is different from a second set of narrowband random access parameters for random access messages transmitted over a terrestrial network, detect one or more random access messages from the UE via a satellite link of the non-terrestrial network based on the first set of narrowband random access parameters, and transmit a random access response to the UE via the satellite link responsive to the detecting.

Another apparatus for wireless communication at a base station is described. The apparatus may include means for transmitting, to a UE, configuration information for a first set of narrowband random access parameters corresponding to random access messages transmitted over a non-terrestrial network that is different from a second set of narrowband random access parameters for random access messages transmitted over a terrestrial network, detecting one or more random access messages from the UE via a satellite link of the non-terrestrial network based on the first set of narrowband random access parameters, and transmitting a random access response to the UE via the satellite link responsive to the detecting.

A non-transitory computer-readable medium storing code for wireless communication at a base station is described. The code may include instructions executable by a processor to transmit, to a UE, configuration information for a first set of narrowband random access parameters corresponding to random access messages transmitted over a non-terrestrial network that is different from a second set of narrowband random access parameters for random access messages transmitted over a terrestrial network, detect one or more random access messages from the UE via a satellite link of the non-terrestrial network based on the first set of narrowband random access parameters, and transmit a random access response to the UE via the satellite link responsive to the detecting.

In some examples of the method, apparatuses, and non-transitory computer-readable medium described herein, the first set of narrowband random access parameters include a first set of starting subcarriers allocated for contention-based random access preambles and are different from a second set of starting subcarriers allocated for contention-based random access preambles in the second set of narrowband random access parameters. In some examples of the method, apparatuses, and non-transitory computer-readable medium described herein, adjacent starting subcarriers of the first set of starting subcarriers have a first frequency spacing that is larger than a second frequency spacing between adjacent starting subcarriers of the second set of starting subcarriers. In some examples of the method, apparatuses, and non-transitory computer-readable medium described herein, the first set of starting subcarriers allocated for contention-based random access preambles have fewer available starting subcarriers per unit of frequency than the second set of starting subcarriers. In some examples of the method, apparatuses, and non-transitory computer-readable medium described herein, the first set of starting subcarriers have a different range of starting subcarriers within a total number of available starting subcarriers for contention-based random access and contention-free random access than that of the second set of starting subcarriers.

In some examples of the method, apparatuses, and non-transitory computer-readable medium described herein, the first set of starting subcarriers corresponds to a subset of the second set of starting subcarriers. In some examples of the method, apparatuses, and non-transitory computer-readable medium described herein, the first set of starting subcarriers may be selected from the second set of starting subcarriers based on one or more of a starting subcarrier index value or a pattern of starting subcarriers from the second set of starting subcarriers.

In some examples of the method, apparatuses, and non-transitory computer-readable medium described herein, the first set of starting subcarriers allocated for contention-based random access corresponds to a subset of a total number of available starting subcarriers allocated for contention-based and contention-free random access preambles in the second set of narrowband random access parameters, where the first set of starting subcarriers may be determined at least in part by a pattern of starting subcarriers from the second set of starting subcarriers. In some examples of the method, apparatuses, and non-transitory computer-readable medium described herein, the first set of narrowband random access parameters include a first set of random access preambles for contention-based random access that have one or more different characteristics than a second set of random access preambles of the second set of narrowband random access parameters. In some examples of the method, apparatuses, and non-transitory computer-readable medium described herein, the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles. In some examples of the method, apparatuses, and non-transitory computer-readable medium described herein, at least one intra-PRU hopping pattern provides that two random access preambles that are adjacent in frequency in a first portion of the PRU are non-adjacent in frequency in a second part of the PRU.

In some examples of the method, apparatuses, and non-transitory computer-readable medium described herein, the first set of random access preambles are configured from a first candidate set of random access preambles and the second set of random access preambles are configured from a second candidate set of random access preambles, where the first candidate set of preambles is a subset of the second candidate set of random access preambles. In some examples of the method, apparatuses, and non-transitory computer-readable medium described herein, one or more preamble formats, preamble subcarrier spacings, or any combinations thereof of the second candidate set of random access preambles are precluded from the first candidate set of random access preambles.

In some examples of the method, apparatuses, and non-transitory computer-readable medium described herein, the transmitting the configuration information further may include operations, features, means, or instructions for transmitting an indication of a first subset of the first set of narrowband random access parameters that provide resources corresponding to the first subset and a second subset of the first set of narrowband random access parameters that provide resources corresponding to the second subset, where the resources corresponding to the first subset have one or more parameters that are different than corresponding parameters of the second subset resources. In some examples of the method, apparatuses, and non-transitory computer-readable medium described herein, the first subset of narrowband random access parameters use random access parameters that are not different from those of terrestrial random access messages and the second subset of narrowband random access parameters use random access parameters specific to non-terrestrial random access messages.

In some examples of the method, apparatuses, and non-transitory computer-readable medium described herein, the random access parameters include one or more of a set of starting subcarrier indices, a frequency hopping pattern for random access preambles, a subcarrier spacing, a number of subcarriers spanned in frequency, or any combinations thereof. In some examples of the method, apparatuses, and non-transitory computer-readable medium described herein, the resources corresponding to the first subset and the resources corresponding to the second subset are located in a same set of frequency resources and in different time resources, in different sets of frequency resources and a same set of time resources, in different frequency and time resources, or interlaced with each other within the same set of time and frequency resources.

In some examples of the method, apparatuses, and non-transitory computer-readable medium described herein, the receiving the random access message further includes receiving one or more further random access messages over the satellite link according to a configuration for periodic contention-free random access message transmissions. In some examples of the method, apparatuses, and non-transitory computer-readable medium described herein, the configuration for periodic contention-free random access resources is transmitted to the UE in radio resource control signaling and activated based on activation signaling transmitted in one or more of a medium access control (MAC) control element or a downlink control information communication from the base station. In some examples of the method, apparatuses, and non-transitory computer-readable medium described herein, the activation signaling includes information for adjustment of one or more parameters associated with the one or more further random access messages.

Some examples of the method, apparatuses, and non-transitory computer-readable medium described herein may further include operations, features, means, or instructions for transmitting, to the UE, in response to the random access message, a physical layer downlink control information communication that provides one or more of a time or frequency correction command for communications via the satellite link. In some examples of the method, apparatuses, and non-transitory computer-readable medium described herein, the first set of narrowband random access parameters supports different random access resource configurations associated with one or more repetitions of a preamble repetition unit (PRU) than the second set of narrowband random access parameters. In some examples of the method, apparatuses, and non-transitory computer-readable medium described herein, a maximum number of preamble repetitions supported by the first set of narrowband random access parameters is less than the maximum number of repetitions supported by the second set of narrowband random access parameters for at least a subset of random access preamble configurations.

DETAILED DESCRIPTION

Figure 1:
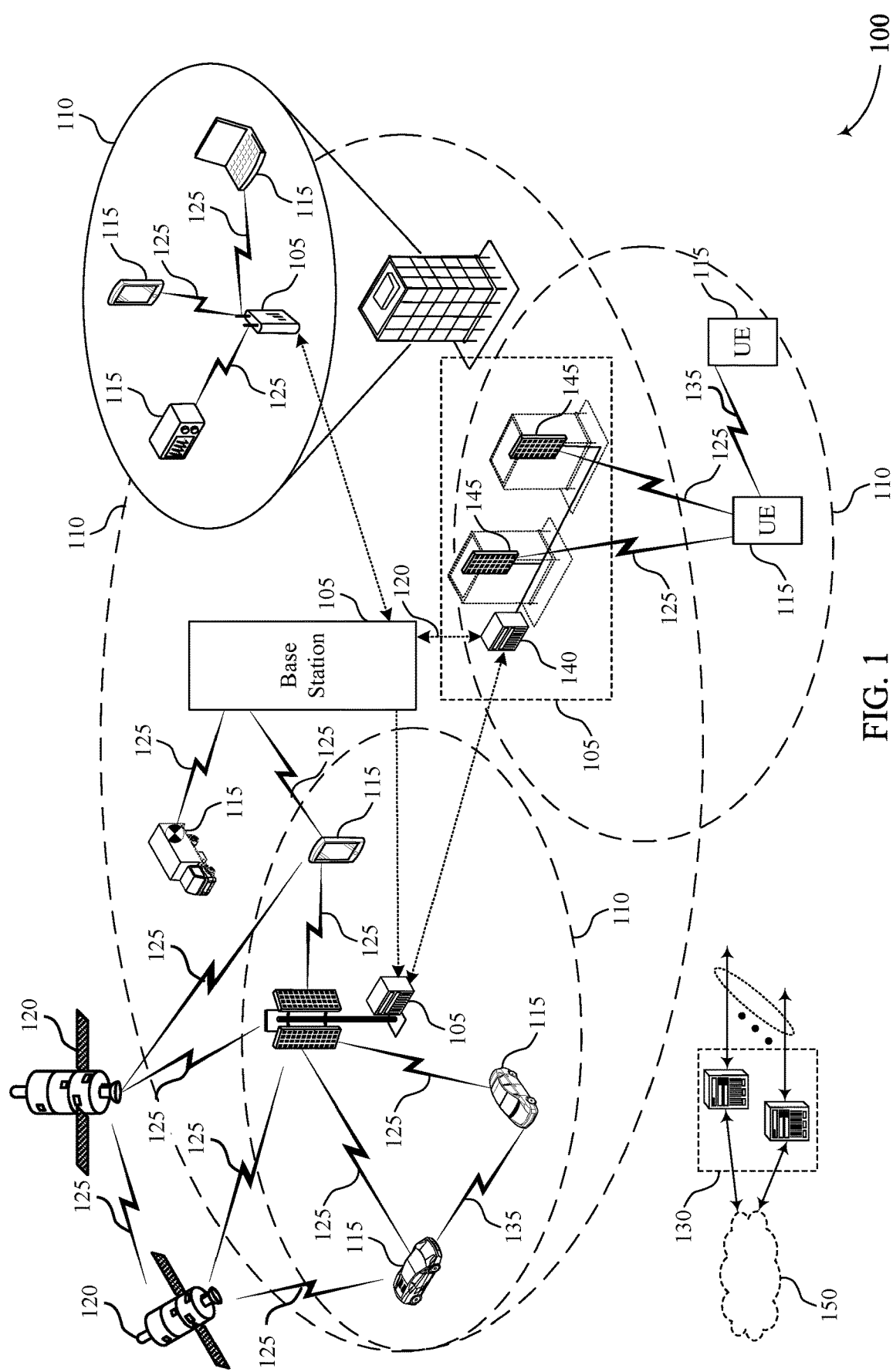
FIG. 1 illustrates an example of a system for wireless communications that supports narrowband random access preambles for non-terrestrial network communications in accordance with aspects of the present disclosure.

Non-terrestrial networks (sometimes referred to as NTNs) may provide coverage by using high-altitude vehicles between user terminals and gateways or base stations (e.g., next-generation NodeBs or giga-NodeBs (which may be referred to as a gNB, and also referred to as access stations or access gateways)). A gateway may, for example, transmit data to a satellite which may then be relayed to a user terminal, and vice-versa. A high-altitude vehicle itself may be a base station, in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) and/or satellites to provide coverage for terrestrial base stations and UEs. The terms HAPS and satellite are used interchangeably herein to refer to a remote NTN device that may provide coverage to one or more other high altitude or terrestrial devices. Likewise, the terms gateway and base station are used interchangeably herein to refer to a network node that serves a UE and provides network access to the UE.

The gateway and the satellite may be thousands of kilometers apart and it may take some time for electromagnetic waves to propagate over the distance between the gateway and the satellite and between the satellite and the user terminal. Thus, the propagation delay for non-terrestrial networks may be many orders of magnitude larger than the propagation delay for terrestrial networks. As such, the round trip delay (sometimes referred to as an RTD) associated with a signal may also be orders of magnitude larger for non-terrestrial networks than for terrestrial networks. Further, due to the high mobility of high-altitude vehicles such as non-geostationary satellites, communications with some satellites may promote large and time-varying Doppler shifts.

In some systems, one or more UEs, satellites, and gateways may support narrowband communications (e.g., narrowband Internet-of-Things (NB-IoT) communications), in which devices may use a relatively narrow frequency bandwidth for communications. Uplink synchronization (in time and frequency) in NB-IoT communications, similarly as in other types of cellular communications systems, may be achieved by a UE transmitting a "random access preamble" over a narrowband physical random access channel (NPRACH) in the uplink. A base station that receives the random access preamble may then determine the time and frequency offset of the received signal from the UE with respect to the base-station's time and frequency references. In terrestrial systems, the UE is then provided with a timing advance (TA) command to compensate for the timing difference with respect to the base-station's reference. In some terrestrial systems, the residual frequency offset of such communications is relatively small, and as long as the base station is aware of the offset (e.g., a carrier frequency offset (CFO)), the base station does not need to send a frequency correction command to the UE. In NTNs, however, the frequency offset between the received signal from the UE and the base-station's reference may be relatively large, due to the multiple Doppler shift components that may be present in NTNs (e.g., due to a satellite's continuous state of motion in its orbit). In some cases such frequency shifts may be significant enough to create a loss of orthogonality across subcarriers across the transmissions received at the base station (i.e., inter-carrier interference (ICI) from multiple UEs having (potentially different) frequency offsets). Various aspects of the present disclosure provide techniques to allow efficient uplink communications for NB-IoT over NTNs, taking into account the potentially large frequency offset.

As described herein, UEs, gateways, and satellites may support random access techniques in which random access preambles may be designed to provide for relatively low ICI for adjacent random access frequency resources used in a NTN. As used herein, "adjacent" resources (e.g., adjacent random access preamble frequency resources) refer to valid resources that are directly prior to or subsequent to a particular resource (e.g., for a valid frequency resource n that is available for transmission of a random access preamble, adjacent random access resources would be valid frequency resources n−1 and n+1, where the n+1$^{th}$ or n−1$^{th}$ valid resource may not be consecutive in frequency to the n$^{th}$ valid resource). In some cases, random access preambles for NTN random access requests may be selected from a first set of random access preambles that may have parameters that are different from a second ret of random access preambles for terrestrial network random access messages. In some cases, the first set of random access preambles may provide for larger frequency shifts in random access messages than the second set of random access preambles for terrestrial random access requests. In some cases, the first set of random access preambles may correspond to a subset of the second set of random access preambles. For example, in some cases an initial subcarrier for a random access preamble of the first set of random access preambles may be selected from a subset of a set of available initial subcarriers, where the second set of random access preambles may include all of the set of available initial subcarriers. In some cases, an entire range of available initial subcarriers from the second set of random access preambles may be available for use in contention-based random access (CBRA) and contention-free random access (CFRA), where CBRA preambles may have a limited set of valid initial subcarriers within the range, and where CFRA preambles may be configured by a base station from random access preambles that correspond to or are different from the second set of random access preambles.

Particular aspects of the subject matter described herein may be implemented to realize one or more of the following potential advantages. The described techniques may support improvements in reliability for random access messages from a UE to a base station in communications using high-altitude vehicles and/or high velocity vehicles (e.g., satellites or other non-terrestrial-based equipment), user terminals, and gateways, in non-terrestrial networks, among other advantages. As such, supported techniques may include features for enhancing efficiency of non-terrestrial communications. The described techniques may also support reduced latency for random access procedures and, in some examples, may promote higher mobility support for user terminals in non-terrestrial networks compared to terrestrial networks, among other benefits.

Aspects of the disclosure are initially described in the context of wireless communications systems. Aspects of the disclosure are also illustrated by resource diagrams and timing diagrams. Aspects of the disclosure are further illustrated by and described with reference to apparatus diagrams, system diagrams, and flowcharts that relate to narrowband random access preambles for non-terrestrial network communications.

FIG. 1 illustrates an example of a wireless communications system 100 that supports narrowband random access preambles for non-terrestrial network communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellites 120 (or other high altitude devices) may communicate with base stations 105 (also referred to as gateways in NTNs) and UEs 115 (or other high altitude or terrestrial communications devices). A satellite 120 may be any suitable type of communication satellite configured to relay communications between different end nodes in a wireless communication system. Satellites 120 may be examples of a space satellite, a balloon, a dirigible, an airplane, a drone, an unmanned aerial vehicle, and/or the like. In some examples, the satellites 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

UEs 115 may communicate with satellites 120 and/or base stations or gateways 105 using communications links 125. In some cases, random access resources for UE 115 random access messages may be configured to provide sufficient frequency differences between adjacent frequency resources such that ICI of random access messages using the adjacent frequency resources, due to movement of the satellite 120, is relatively low or eliminated for communications links 125 via a satellite 120. In accordance with various techniques discussed herein, a UE 115 may select random access resources for random access messages via a NTN from a different set of available random access resources than used for terrestrial random access messages.

Figure 2:
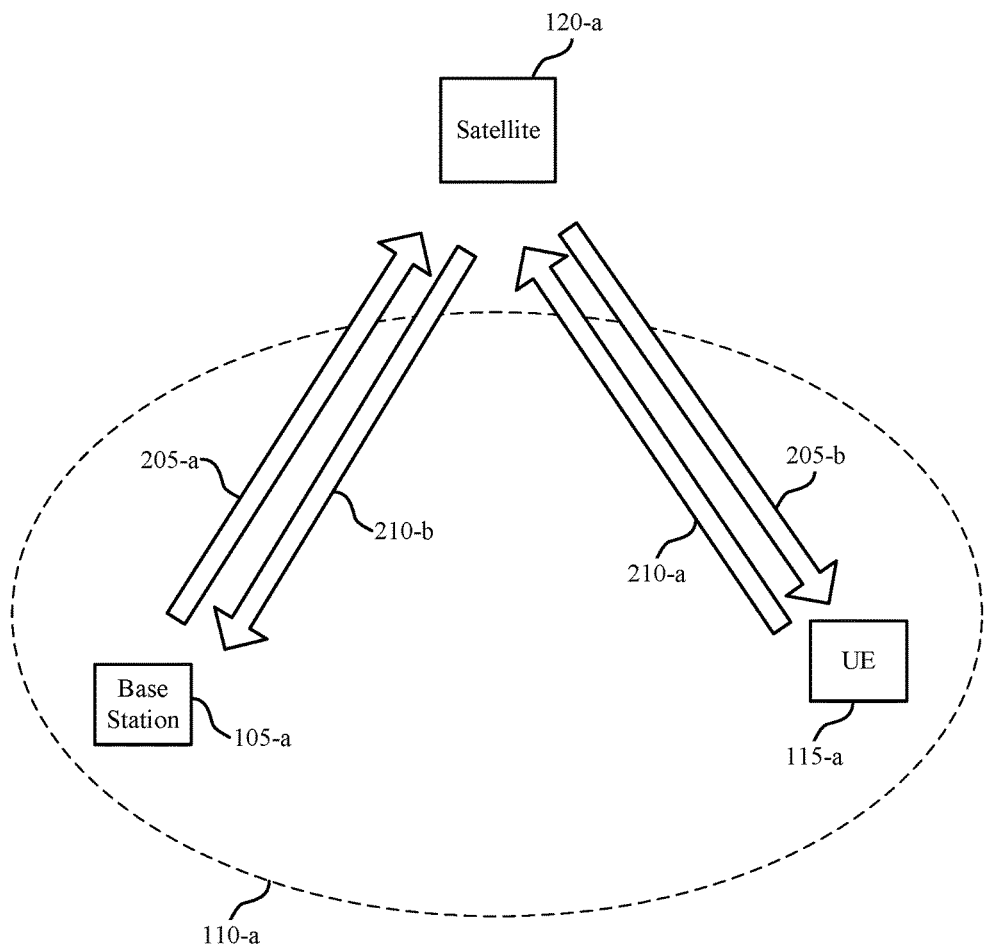
FIG. 2 illustrates an example of a portion of a wireless communications system that supports narrowband random access preambles for non-terrestrial network communications in accordance with aspects of the present disclosure.

FIG. 2 illustrates an example of a wireless communications system 200 that supports narrowband random access preambles for non-terrestrial network communications in accordance with aspects of the present disclosure. In some examples, wireless communications system 200 may implement aspects of wireless communications system 100. Wireless communications system 200 may include a gateway 105-a (or base station), a UE 115-a, and a satellite 120-a, which may be examples of a base station 105, UEs 115, and satellites 120 as described with reference to FIG. 1. The gateway 105-a may serve a coverage area 110-a in cases of a terrestrial network, and the satellite 120-a may serve coverage area 110-a in cases of an NTN.

In some examples, the satellite 120-a may relay communications between the gateway 105-a and the UE 115-a. For example, the gateway 105-a may communicate with the UE 115-a via the satellite 120-a or vice-versa. In some examples, for communications originating at the gateway 105-a and going to the UE 115-a, the gateway 105-a may transmit an uplink transmission 205-a to the satellite 120-a, which may be referred to as a service link. The satellite 120-a may relay the uplink transmission 205-a as a downlink transmission 205-b to the UE 115-a, which may be referred to as a feeder link. In other examples, for communications originating at the UE 115-a and going to the gateway 105-a, the UE 115-a may transmit an uplink transmission 210-a to the satellite 120-a via feeder link. The satellite 120-a may relay the uplink transmission 210-a as a downlink transmission 210-b to gateway 105-a via the service link.

The gateway 105-a and the satellite 120-a may be thousands of kilometers apart and the satellite 120-a may be moving at a relatively high speed relative to the gateway 105-a. Likewise, the gateway 105-a and UE 115-a may be thousands of kilometers apart and the satellite 120-a may be moving at a relatively high speed relative to the UE 115-a. Due to the high rates of speed of the satellite 120-a, Doppler shifts of communications for non-terrestrial networks may be many orders of magnitude larger than the Doppler shifts for terrestrial networks. As a result, in cases where the UE 115-a uses NPRACH resources for random access message transmissions, such messages may be subject to Doppler shifts that, if terrestrial NPRACH configurations were implemented, may experience ICI in the event that another UE were to use an adjacent random access resource in frequency.

In some cases, NPRACH preambles for NTN random access requests may be configured to provide tolerances for additional frequency shifts relative to terrestrial NPRACH configurations. In some cases, NPRACH preambles may be selected by the UE 115-a from a first set of random access preambles for NTN communications that are different from a second set of random access preambles for terrestrial communications. In some cases, the first set of random access preambles may correspond to a subset of the second set of random access preambles. For example, in some cases an initial subcarrier for a random access preamble of the first set of random access preambles may be selected from a subset of a set of available initial subcarriers of the second set of random access preambles. In some cases, an entire range of available initial subcarriers from the second set of random access preambles may be available for use in contention-based random access (CBRA) and for use in contention-free random access (CFRA). In such cases, CBRA preambles may have a limited set of valid initial subcarriers within the range, and CFRA preambles for NTN communications may be configured by a base station from random access preambles that correspond to or are different from the second set of random access preambles. The base station in such cases may schedule different UEs 115 with CFRA preambles such that ICI from concurrent random access transmissions is low or not present.

Figure 3:
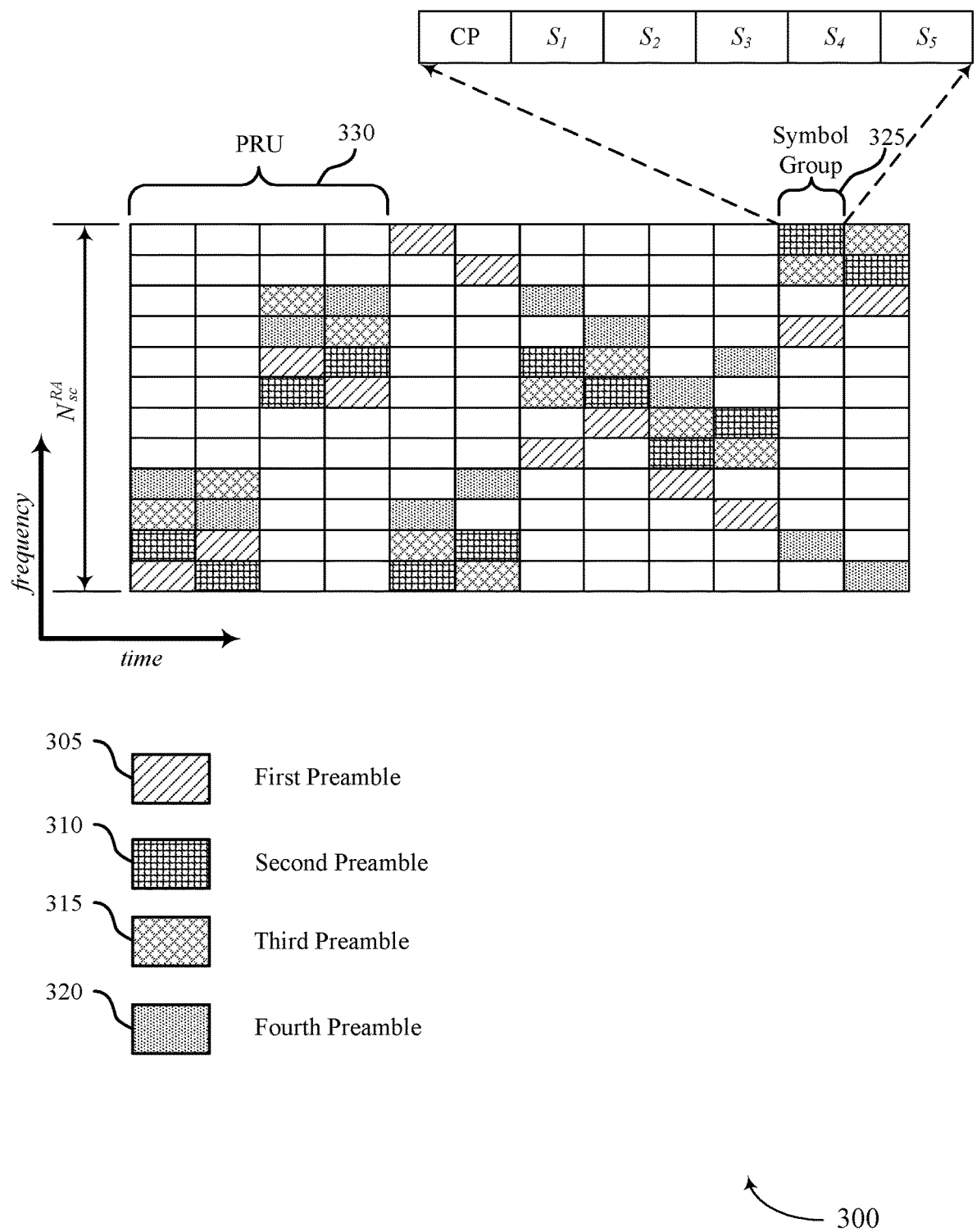
FIG. 3 illustrates an example of a time-frequency mapping of narrowband random access preambles that supports narrowband random access preambles for non-terrestrial network communications in accordance with aspects of the present disclosure.

FIG. 3 illustrates an example of a time-frequency mapping of narrowband random access preambles 300 that supports narrowband random access preambles for non-terrestrial network communications in accordance with aspects of the present disclosure. In some examples, time-frequency mapping of narrowband random access preambles 300 may implement aspects of wireless communications system 100 or 200. In this example, a set of frequency resources in a set of random access resources may include a number of subcarriers that are available for a random access preamble transmission (e.g., a random access request that is transmitted from a UE to a base station), which may be referred to as a number of subcarriers spanned in frequency or $N_{sc}^{RA}$.

A UE may transmit a random access preamble on the NPRACH channel for several different purposes, including for the purposes of enabling uplink time-frequency synchronization at the network, requesting channel access, and the like. Two types of NPRACH transmissions include UE-initiated communications (also termed contention-based), and network-initiated (also termed contention-free). A number of NPRACH preambles may be configured, which in this example includes a first preamble 305, a second preamble 310, a third preamble 315, and a fourth preamble 320. The time-frequency mapping of NPRACH preambles 305 through 320 may provide frequency hopping patterns that provide enhanced frequency diversity of a random access message transmission. Each NPRACH preamble 305 through 320 may include a symbol group 325, which may include 3 or 5 (depending on preamble format) repetitions an OFDM symbol, along with a cyclic prefix (CP). A preamble repetition unit (PRU) 330 may include a configured number of symbol groups, such as 4 symbol groups in the example of FIG. 3. The symbol groups 325 may follow frequency hopping patterns, which may be further sub-divided into Intra-PRU hopping patterns (e.g., fixed patterns relative to the frequency location of the starting symbol group in a preamble repetition unit) and Inter-PRU hopping patterns (e.g., a pseudorandom determination of the frequency location of the starting symbol group in a PRU). With the above structure, an NPRACH preamble (out of all configured preambles) may be specified by the frequency location of the first symbol group in the first PRU, which may be determined according to:

$$n_{sc}^{RA}(0) = n_{start} + \tilde{n}_{SC}^{RA}(0) = N_{scoffset}^{NPRACH} + \left\lfloor \frac{n_{init}}{N_{SC}^{RA}} \right\rfloor \times N_{SC}^{RA} + n_{init} \bmod N_{SC}^{RA}$$

where $n_{init}$ is an initial subcarrier, $N_{sc}^{RA}$ is the number of subcarriers that are available to map a random access preamble in the random access resources, and $N_{scoffset}^{NPRACH}$ is an offset value that is configured at a UE (e.g., that is provided by a base station). Following the determination of the starting symbol group in a PRU, the random access preamble may follow the configured hopping pattern, such as illustrated in FIG. 3, which shows an example for FDD preamble format 0, 1, although techniques as discussed herein may be used with various other preamble formats.

As shown in the example of FIG. 3, the NPRACH preamble to be used is thus determined by the variable $n_{init}$, where, for UE-initiated preamble transmission (i.e., CBRA), the UE's MAC layer may randomly pick a value for $n_{init}$ within the set $\{0, 1, \ldots, N_{sc\_cont}^{NPRACH}\}$ out of the total possible range set $\{0, 1, \ldots, N_{sc}^{NPRACH}\}$. For network-initiated preamble transmission (i.e., CFRA), the network indicates a value of $n_{init}$ from the set $\{0, 1, \ldots, N_{sc}^{NPRACH}\}$. The values of $N_{sc\_cont}^{NPRACH}$ and $N_{sc}^{NPRACH}$ are network configured and indicated by higher layers to a MAC layer of the UE.

In some cases, for terrestrial-based random access, from the above ranges of values for $n_{init}$, a priori, all values in the range set are permissible, and two UEs may end up randomly choosing $n_{init}^{UE1}$ and $n_{init}^{UE2}$ that are adjacent (e.g., differ by one starting subcarrier). As discussed above, in deployments that may experience relatively large Doppler shifts, random access messages transmitted in adjacent subcarriers may experience ICI, and thus in accordance with various aspects as discussed herein frequency resources for a random access message may be selected to avoid ICI. In some cases, for terrestrial NB-IoT random access, since the uplink frequency offset is in many cases not large enough to cause ICI at the base station between such "adjacent" preamble sequences, the selection of $n_{init}$ for CBRA may be from all available values of $N_{sc\_cont}^{NPRACH}$. In other cases, such as discussed with reference to the examples of FIGS. 4 through 7, UEs may use random access preambles that provide for reduced ICI in high Doppler shift communications.

Figure 4:
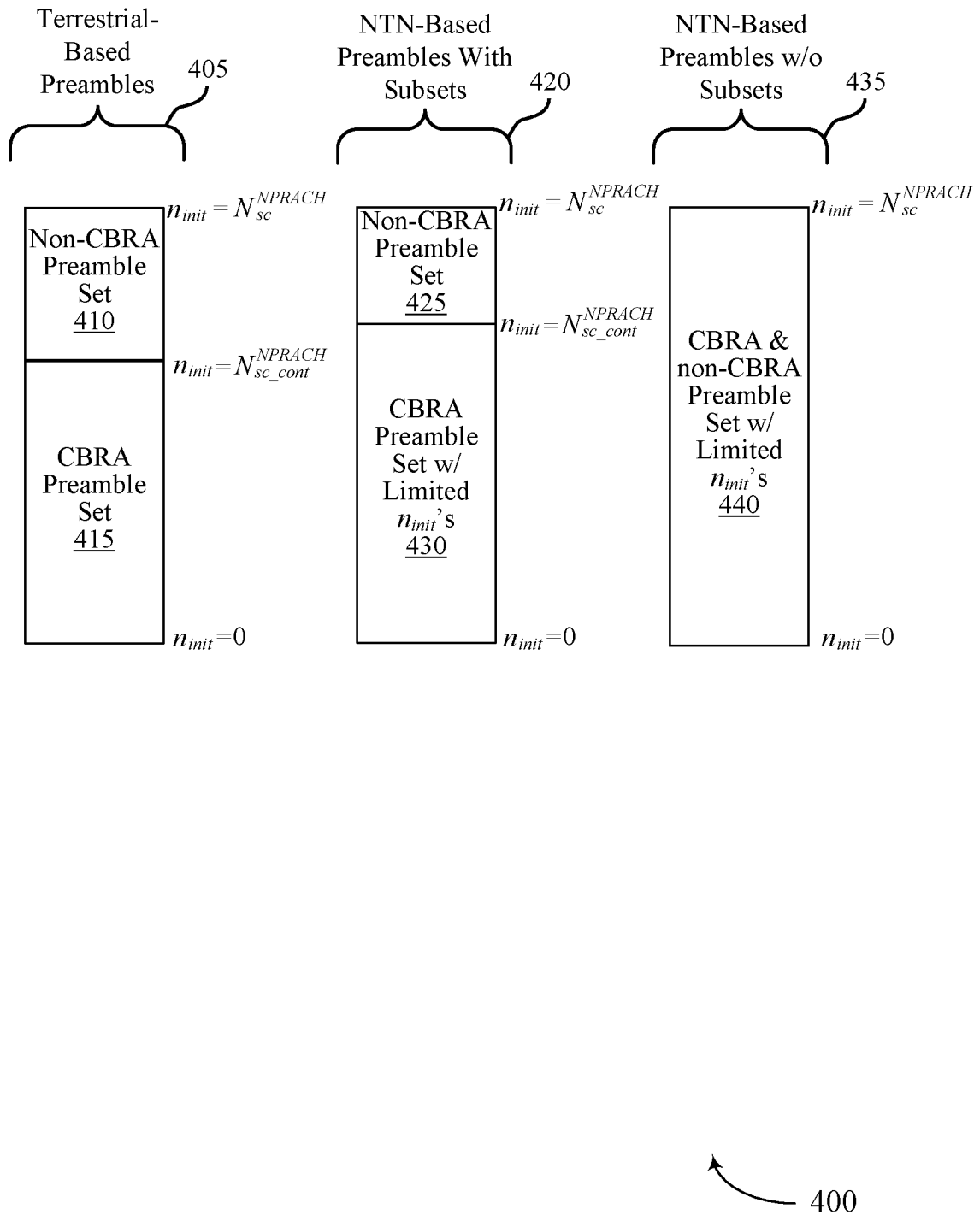
FIGS. 4 through 7 illustrate examples of narrowband random access resources that support narrowband random access preambles for non-terrestrial network communications in accordance with aspects of the present disclosure.

FIG. 4 illustrates an example of a narrowband random access resources 400 that supports narrowband random access preambles for non-terrestrial network communications in accordance with aspects of the present disclosure. In some examples, narrowband random access resources 400 may implement aspects of wireless communications system 100 or 200. In this example, random access preamble configurations in NTN deployments may be different from those for terrestrial deployments.

In this example, a terrestrial configuration of preambles 405 may include a non-CBRA preamble subset 410 that may include values of $n_{init}$ that are reserved for CFRA and may be provided to a UE as part of a network-initiated random access message. The set of preambles 405 configured for terrestrial communication in this example also includes a CBRA preamble subset 415, from which the UE can randomly select a value for $n_{init}$. As discussed above, when randomly selecting a value for $n_{init}$, the UE may select from the values $\{0, 1, \ldots, N_{sc\_cont}^{NPRACH}\}$ of the CBRA preamble subset 415, and in cases with network initiated random access the value for $n_{init}$ may be provided and from the total possible range set $\{0, 1, \ldots, N_{sc}^{NPRACH}\}$.

In some cases, different random access parameters may be used for NTN random access (e.g., for NB-IoT random access via a NTN), which provide for reduced ICI in the presence of relatively high Doppler frequency shifts for communications to or from a UE. In the example of FIG. 4, a candidate set of NTN preambles 420 may be configured that provide a limited number of valid $n_{init}$ values for CBRA out of all $n_{init}$ values in the range of the CBRA preamble subset 430, and also provide a non-CBRA preamble subset 425. In this candidate configuration, the CBRA preamble subset 430 may include additional possible $n_{init}$ values compared to those provided for the terrestrial configuration of preambles 405. Put another way, the maximum value of $n_{init}$ for the subset 430 may be larger than for subset 415. In another example, a second candidate set of NTN preambles 435 may be provided that does not include subsets, where the $n_{init}$ values may be selected from all available $N_{sc}^{NPRACH}$ values 440. In such cases, relative to terrestrial configuration of preambles 405, the differences may be in, for example, a range (maximum and minimum) of starting subcarriers for CBRA where, instead of the first $N_{sc\_cont}^{NPRACH}$ starting subcarriers out of a possible $N_{sc}^{NPRACH}$ subcarriers being allocated to CBRA, the CBRA preambles may be configured across the entire $N_{sc}^{NPRACH}$ subcarriers, as in the second candidate set of NTN preambles 435. In some cases, certain restrictions may be applied to the $n_{init}$ values that may be selected, such as skipping certain starting subcarriers within a range to provide robustness from ICI across CBRA preambles. In some cases, the number of starting subcarriers allocated for CBRA may be configured to provide a reduced number of starting subcarriers for CBRA preambles per unit of frequency as compared to terrestrial configuration of preambles 405. In other cases, the values and/or patterns of starting subcarriers within the range of possible values may be configured to provide robustness from ICI across CBRA preambles. For example, for CBRA, the UE may choose the value of $n_{init}$ randomly from the set $$\left\{0, 2, 4, \ldots, \left\lfloor\frac{N_{sc\_cont}^{NPRACH}}{2}\right\rfloor\right\}$$

in the candidate NTN configuration of preambles 420, which provides more protection from ICI across valid CBRA preambles. In examples where the second candidate set of NTN preambles 435 is used, the UE may choose the value of $n_{init}$ randomly from the set $$\left\{0, 2, 4, \ldots, \left\lfloor\frac{N_{sc}^{NPRACH}}{2}\right\rfloor\right\}.$$

It is noted that the example patterns of FIG. 4 are exemplary only, for purposes of illustration and discussion of the concept of skipping certain starting subcarriers and/or increasing the range of starting subcarriers to improve robustness to ICI of CBRA preambles. Patterns other than these examples may be used and are within the scope of the present disclosure.

Figure 5:
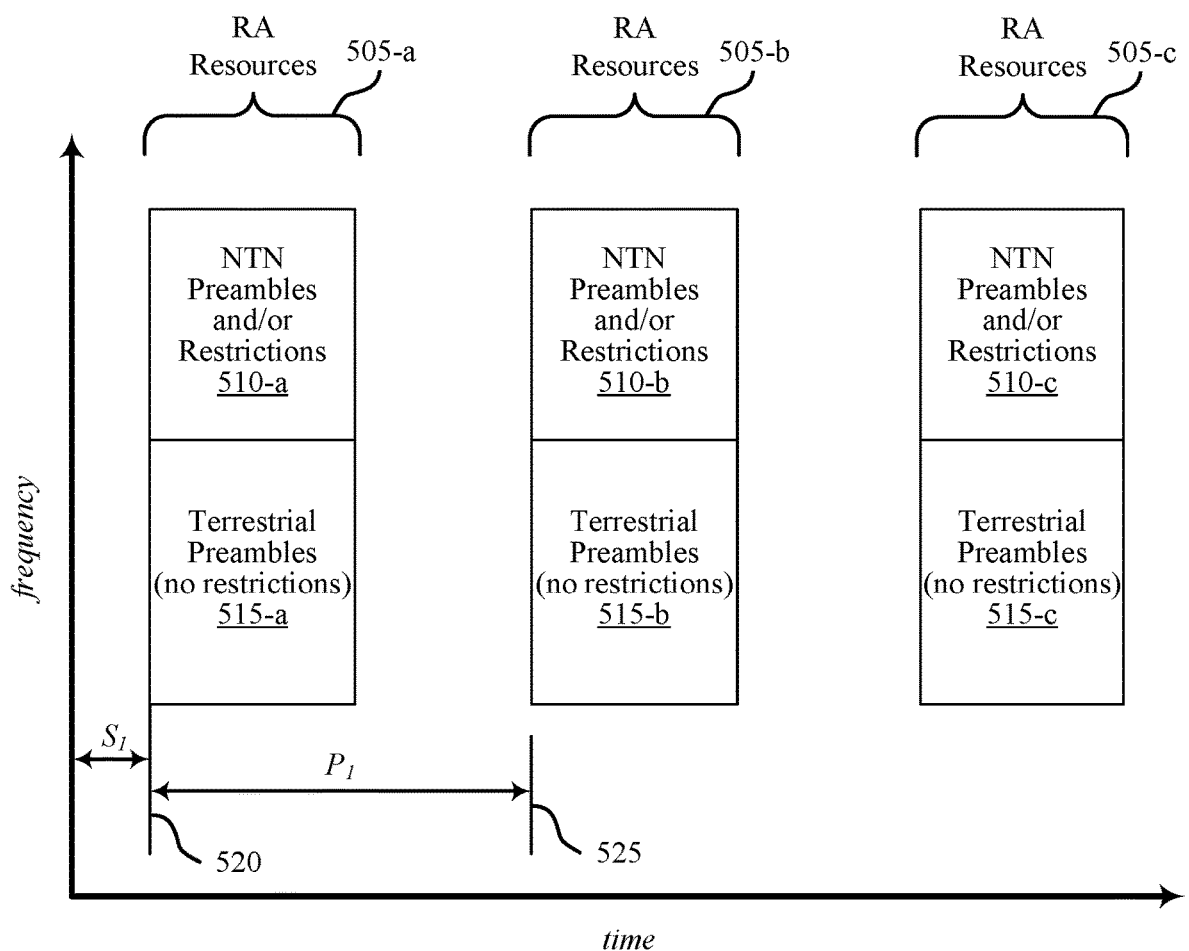
Figure 6:
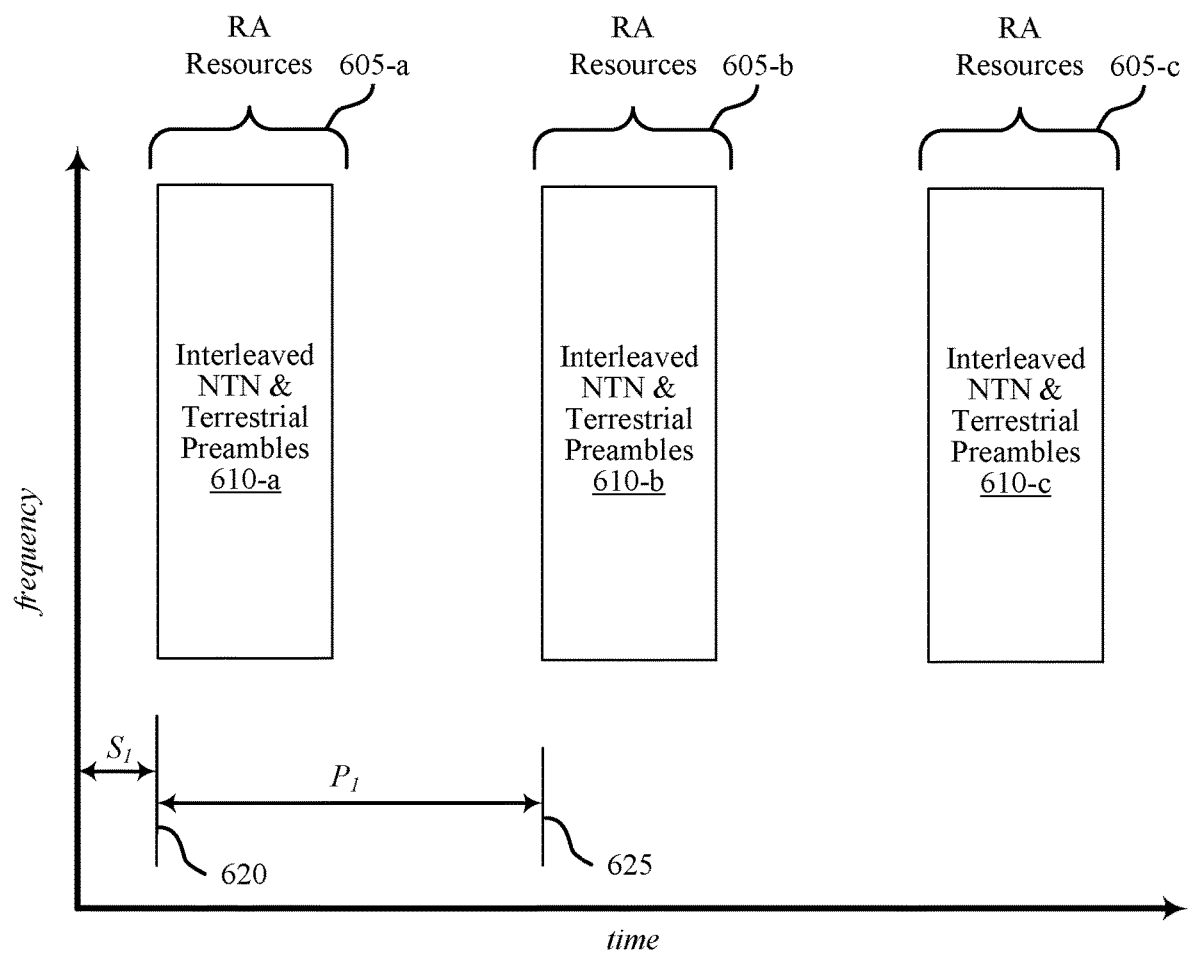
Figure 7:
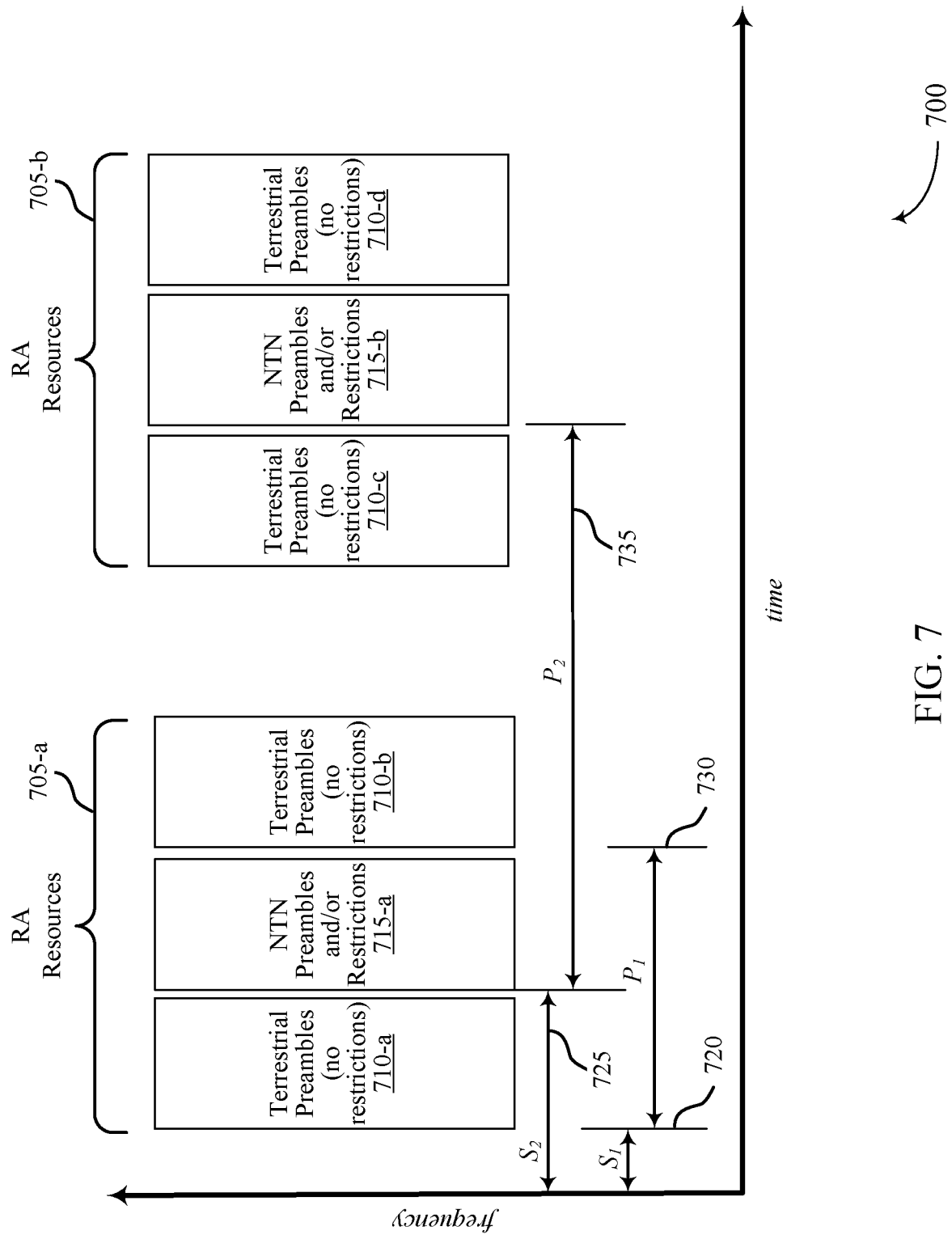

In other cases, for at least for some time-frequency locations for NTN random access preamble transmissions, at least some preambles may differ from terrestrial preambles (e.g., the preambles in 405) in at least one defining characteristic. For example, NTN preambles may have a different intra-PRU hopping pattern, a different inter-PRU hopping pattern, a different subcarrier Spacing (e.g. 7.5 kHz), a different frequency span (i.e., $N_{sc}^{RA}$), or any combinations thereof, that may provide protection from ICI across CBRA preambles. For example, for at least a set of preamble sequences, the intra-PRU hopping pattern may be configured such that if two of these sequences are adjacent in frequency in a first part of a PRU, they are not adjacent in the second part of the PRU (while in the terrestrial preambles 405, if any two sequences are adjacent in the first part of a PRU, they are also adjacent (by the same amount in frequency) in the second part of the PRU). In further cases, for at least for some time-frequency locations for random access preamble transmissions, certain preambles may be precluded in order to provide protection from ICI across CBRA preambles. For example, certain preamble formats (e.g. Preamble Format 2) may be precluded, or preambles with certain subcarrier spacings (e.g., 1.25 kHz) may be precluded. While the example of FIG. 4 shows different sets of preambles that may be used for terrestrial and for NTN deployments, such sets of preambles may have other configurations and may be provided in periodic resources in which different resources may have different configurations for NTN random access messages. FIGS. 5 through 7 show some examples of such random access resource configurations for NTN.

While various of the described techniques provide for protection from ICI across CBRA preambles, CFRA preambles may be indicated by the network and may also be selected to provide protection from ICI. When used for uplink time and frequency synchronization, a network-initiated CFRA preamble may in some cases be used to track drifts in timing and frequency over time and, as opposed to initial synchronization and correction, these drifts may be much smaller than initial offsets. As a result, some of the CBRA techniques provided herein may not be needed for CFRA preambles in NTN. Thus, in some cases, properties for at least some CFRA preambles may be different from that of UE-initiated CBRA preambles for NB-IoT over NTN. Note that this is different than terrestrial NB-IoT, where the properties for both CFRA and CBRA preambles are the same. For example, CFRA preambles in NTN may follow terrestrial NB-IoT designs (e.g., legacy subcarrier spacing, unrestricted $n_{init}$ within CFRA preamble space, legacy hopping patterns, legacy $N_{sc}^{RA}$, etc.), while at least some CBRA preambles may incorporate some of the designs described herein for providing protection from ICI across CBRA preambles.

In some cases, network-initiated CFRA preamble transmission may be triggered by an NPDCCH order, where a particular encoding of DCI (e.g., DCI Format N1) may indicate to the UE the resource and preamble to transmit on NPRACH. In NTN deployments, the drift may follow a relatively pre-determined evolution, owing to the regular orbit of the satellite causing predictable Doppler shifts and the like. As a result, the network may determine that (e.g., every 10 seconds) the UE needs to correct its accumulated drift. For such use cases, for NB-IoT over NTN, a UE may be configured with a periodic transmission of CFRA preambles. The configuration may be via higher layers (e.g. RRC signaling), and may in some cases be activated or deactivated by DCI. In some cases, the activation/deactivation DCI may also adjust parameters such as transmission periodicity, first transmission occasion, and the like.

In some cases, timing corrections (e.g., timing advance (TA) commands) are provided by MAC control elements (CEs), which requires an NB-IoT UE to monitor an NPDSCH to receive such commands. An exception to this case is for transmission on a preconfigured uplink resource (PUR), where a DCI (on NPDCCH) can provide a TA command, thereby saving UE power from not having to monitor NPDSCH. Further, for NTN, a frequency correction command, similar to a TA command, may be provided to UEs in order to compensate frequency shifts. In some cases, an NB-IoT UE in an NTN may receive time and/or frequency correction commands in a physical layer DCI. In some cases, such commands may be provided in DCI if the time/frequency offsets relatively small (e.g., below a threshold value), and may be provided in a MAC-CE otherwise.

Additionally, due to relatively rapid change of satellite beams (e.g., especially for Low Earth Orbit (LEO) satellites), very large repetitions for NB-IoT channels (e.g., in accordance with coverage enhancement techniques designed for deep coverage) may not be feasible for NTN deployments. As a result, the supported NPRACH resource configurations (e.g., specifying a number of repetitions of a PRU) may be different for NTN versus terrestrial random access. In particular, the maximum number of repetitions supported for NPRACH in NTN may be less than the maximum number of repetitions supported for NPRACH in terrestrial.

FIG. 5 illustrates an example of a narrowband random access resources 500 that supports narrowband random access preambles for non-terrestrial network communications in accordance with aspects of the present disclosure. In some examples, narrowband random access resources 500 may implement aspects of wireless communications system 100 or 200. In this example, periodic random access resources 505 may be configured.

In this example, random access resources 505 may include a first set of resources 510 with NTN preambles or restrictions (e.g., as discussed with reference to FIG. 4) and a second set of resources 515 that are not different in properties and configuration to terrestrial preambles (e.g., without restrictions on selection of preambles as in terrestrial preambles). In some cases, the first set of resources 510 may be used for CBRA, and the second set of resources 515 may be used for CFRA. In other cases, both the first set of resources 510 and the second set of resources 515 may be used for CFRA, and only the first set of resources 510 may be used for CBRA. In the example of FIG. 5, periodicity of the random access resources 505 may be defined by an offset value 520 ($S_1$) and period 525 ($P_1$). Thus, random access resources 505-$a$ may occur at a time $S_1$ following a reference starting time, with subsequent instances of random access resources 505-$b$ and 505-$c$ occurring according to period 525. A UE operating in such a deployment may select a random access preamble based on the random access resources 505.

FIG. 6 illustrates an example of a narrowband random access resources 600 that supports narrowband random access preambles for non-terrestrial network communications in accordance with aspects of the present disclosure. In some examples, narrowband random access resources 600 may implement aspects of wireless communications system 100. In this example, again, periodic random access resources 605 may be configured.

In this example, random access resources 605 may include interleaved preambles 610 in which preambles having restrictions or parameters for NTN (e.g., as discussed with reference to FIG. 4) are interleaved with preambles that are not different in properties and configuration to terrestrial preambles (e.g., without restrictions on selection of preambles as in terrestrial preambles). In some cases, the preambles having restrictions or parameters for NTN may be used for CBRA and the other interleaved preambles (i.e., without restrictions) may be used for CFRA. In this example, periodicity of the random access resources 605 may be defined by an offset value 620 ($S_1$) and period 625 ($P_1$). Thus, a first instance of random access resources 605-$a$ may occur at a time $S_1$ following a reference starting time, with a second instance of random access resources 605-$b$ and a third instance of random access resources 605-$c$ occurring according to period 625. A UE operating in such a deployment may select a random access preamble based on the random access resources 605.

FIG. 7 illustrates an example of a narrowband random access resources 700 that supports narrowband random access preambles for non-terrestrial network communications in accordance with aspects of the present disclosure. In some examples, narrowband random access resources 700 may implement aspects of wireless communications system 100 or 200. In this example, again, periodic random access resources 705 may be configured.

In this example, a first set of random access resources 715 may occur with a reduced periodicity as compared to a second set of random access resources 710 that have a longer periodicity. In some cases, the first set of random access resources 715 may have NTN preambles or restrictions (e.g., as discussed with reference to FIG. 4) and the second set of resources 710 use preambles that are not different in properties and configuration to terrestrial preambles (e.g., without restrictions on selection of preambles as in terrestrial preambles). In some cases, the second set of random access resources 710 may be used for CFRA and may provide enhanced scheduling flexibility to a base station, while the first set of random access resources 715 may be used for CBRA. In this example, a first periodicity of the second set of random access resources 710 may be defined by a first offset value 720 ($S_1$) and first period 730 ($P_1$). In this example, a second periodicity of the first set of random access resources 715 may be defined by a second offset value 725 ($S_2$) and second period 735 ($P_2$).

In some cases, the second periodicity 735 may be greater than the first periodicity 730, and thus provide that the second set of random access resources 710 has more resources than the first set of random access resources 715. In such examples, UEs may be allocated resources for random access messages based on a likelihood of frequency error that may be present in communications from the UE. For example, the second set of random access resources 710 may be designed for UEs that have poor or no global navigation satellite system (GNSS) support, and as a result may have large residual frequency errors, and the first set of random access resources 715 may be designed for UEs with simultaneous GNSS and relatively little uncompensated error. In some cases, the first set of random access resources 715 (e.g., having the properties such as skipped starting subcarriers, etc.) may occur less frequently than the second set of random access resources 710, so as to not unnecessarily lower overall random access capacity due to the presence of a relatively small number of UEs with poor or no GNSS support and/or poor internal compensation.

Figure 8:
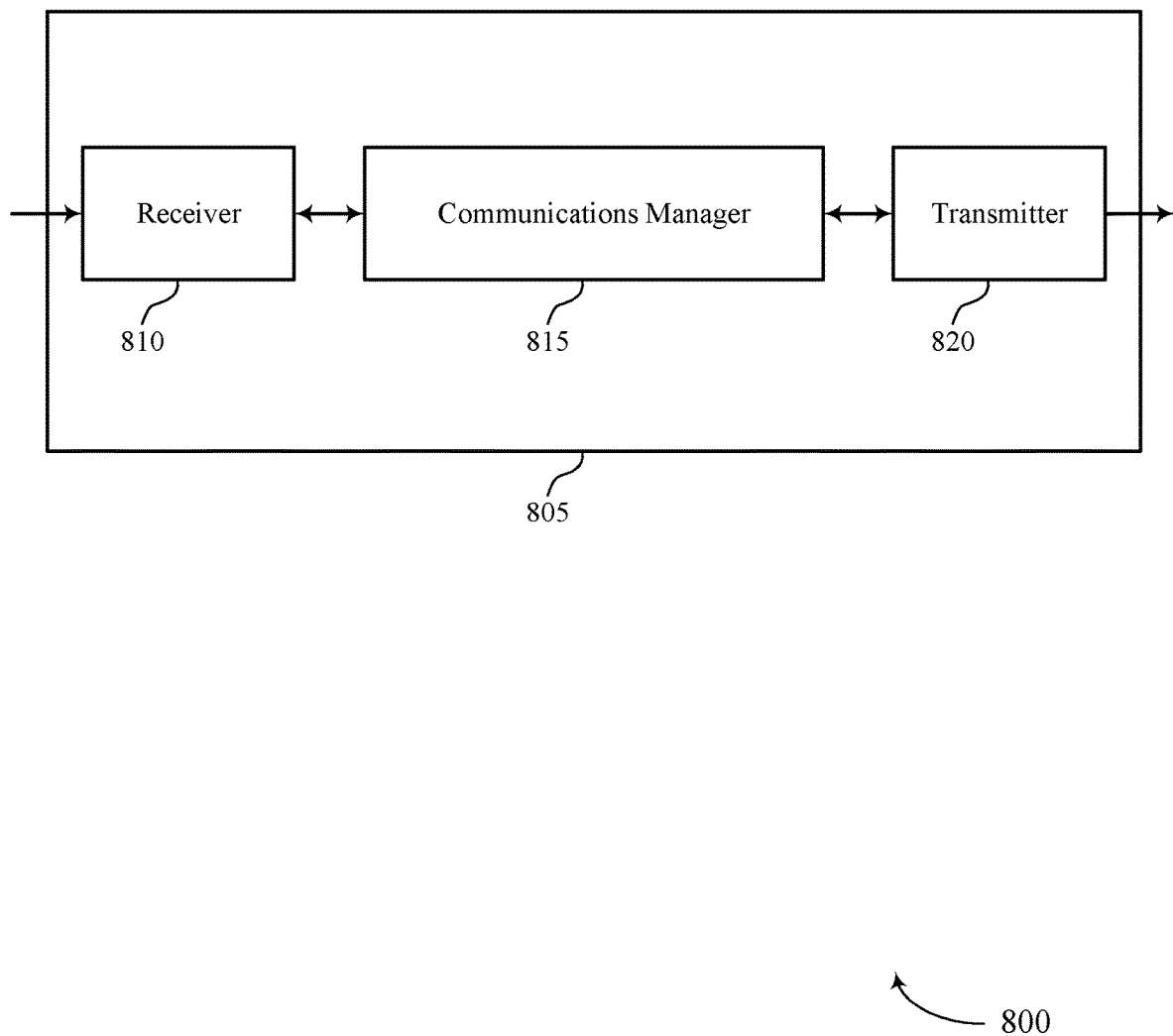
FIGS. 8 and 9 show block diagrams of devices that support narrowband random access preambles for non-terrestrial network communications in accordance with aspects of the present disclosure.

FIG. 8 shows a block diagram 800 of a device 805 that supports narrowband random access preambles for non-terrestrial network communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to narrowband random access preambles for non-terrestrial network communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, configuration information for a first set of narrowband random access parameters corresponding to random access messages transmitted over a non-terrestrial network that is different from a second set of narrowband random access parameters for random access messages transmitted over a terrestrial network, select, based on the receiving, one or more narrowband random access parameters from the first set of narrowband random access parameters for a random access message to be transmitted to the base station via a satellite link of the non-terrestrial network, and transmit the random access message to the base station via the satellite link using the selected narrowband random access parameters. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
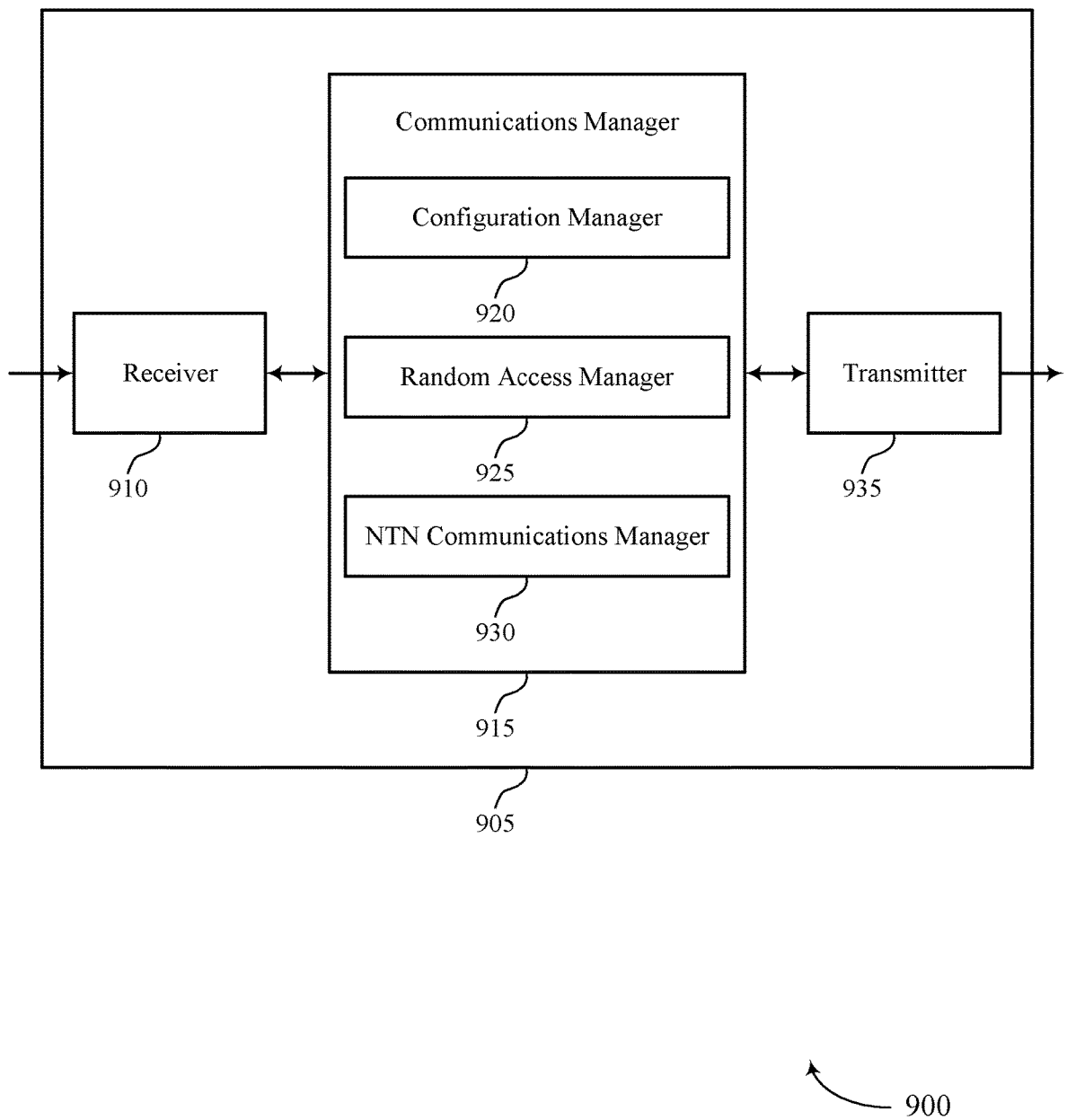

FIG. 9 shows a block diagram 900 of a device 905 that supports narrowband random access preambles for non-terrestrial network communications in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to narrowband random access preambles for non-terrestrial network communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a random access manager 925, and a NTN communications manager 930. The communications manager 915 may be an example of aspects of the communications manager 1110 described herein.

The configuration manager 920 may receive, from a base station, configuration information for a first set of narrowband random access parameters corresponding to random access messages transmitted over a non-terrestrial network that is different from a second set of narrowband random access parameters for random access messages transmitted over a terrestrial network.

The random access manager 925 may select, based on the receiving, one or more narrowband random access parameters from the first set of narrowband random access parameters for a random access message to be transmitted to the base station via a satellite link of the non-terrestrial network.

The NTN communications manager 930 may transmit the random access message to the base station via the satellite link using the selected narrowband random access parameters.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
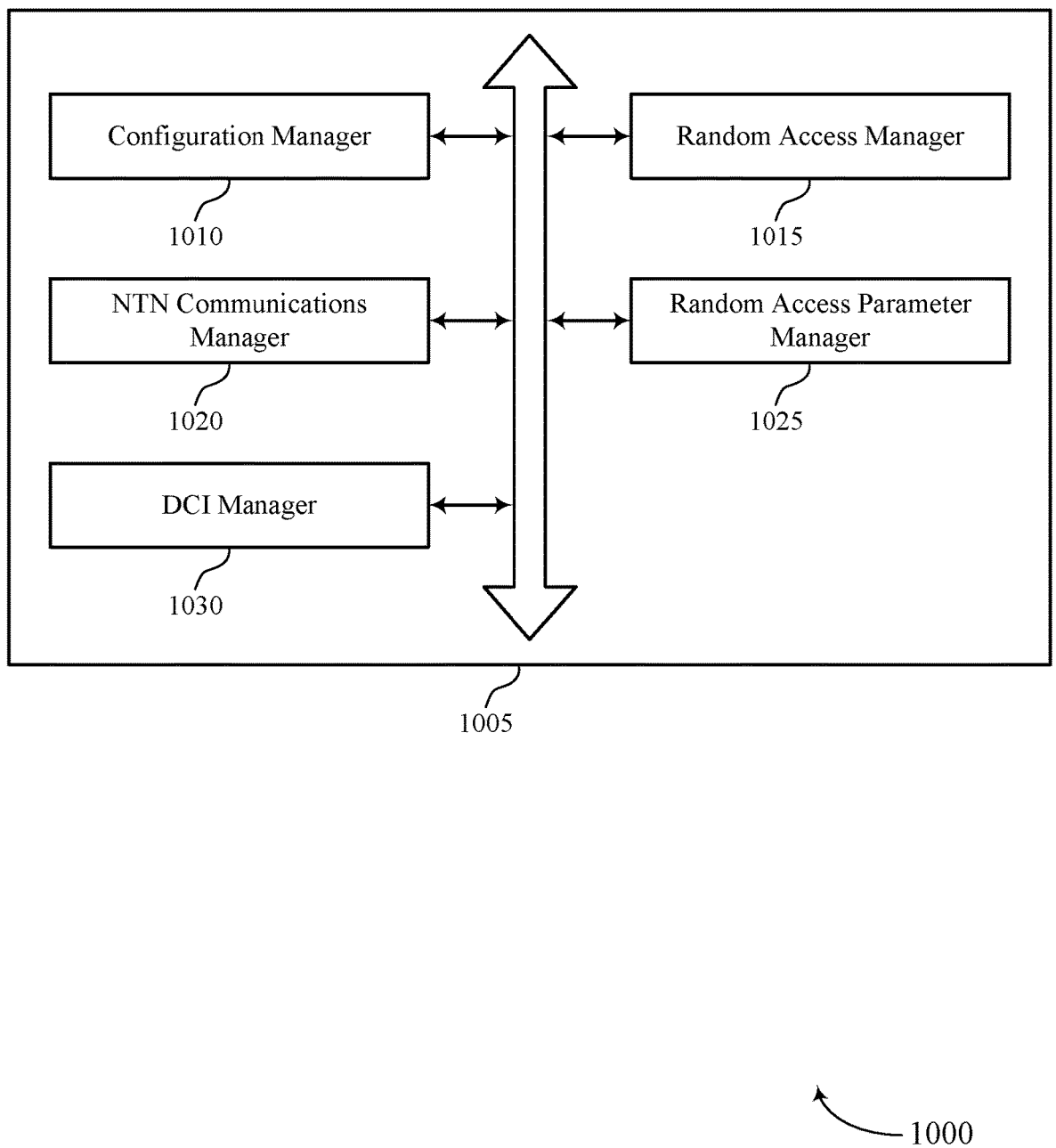
FIG. 10 shows a block diagram of a communications manager that supports narrowband random access preambles for non-terrestrial network communications in accordance with aspects of the present disclosure.

FIG. 10 shows a block diagram 1000 of a communications manager 1005 that supports narrowband random access preambles for non-terrestrial network communications in accordance with aspects of the present disclosure. The communications manager 1005 may be an example of aspects of a communications manager 815, a communications manager 915, or a communications manager 1110 described herein. The communications manager 1005 may include a configuration manager 1010, a random access manager 1015, a NTN communications manager 1020, a random access parameter manager 1025, and a DCI manager 1030. Each of these modules may communicate, directly or indirectly, with one another (e.g., via one or more buses).

The configuration manager 1010 may receive, from a base station, configuration information for a first set of narrowband random access parameters corresponding to random access messages transmitted over a non-terrestrial network that is different from a second set of narrowband random access parameters for random access messages transmitted over a terrestrial network. In some examples, the configuration manager 1010 may receive an indication of a first subset of the first set of narrowband random access parameters that provide contention-free random access resources and a second subset of the first set of narrowband random access parameters that provide contention-based random access resources, where the contention-free random access resources have one or more parameters that are different than corresponding parameters of the contention-based random access resources.

In some cases, the first set of narrowband random access parameters include a first set of random access preambles for contention-based random access that have one or more different characteristics than a second set of random access preambles of the second set of narrowband random access parameters. In some cases, the first set of random access preambles are configured from a first candidate set of random access preambles and the second set of random access preambles are configured from a second candidate set of random access preambles, where the first candidate set of preambles is a subset of the second candidate set of random access preambles. In some cases, the first set of narrowband random access parameters include a first subset of narrowband random access parameters that correspond to terrestrial network narrowband random access parameters and a second subset of narrowband random access parameters that are different than terrestrial network narrowband random access parameters.

In some cases, the first subset of narrowband random access parameters and the second subset of narrowband random access parameters are located in a same set of frequency resources and in different time resources, in different sets of frequency resources and a same set of time resources, or in different frequency and time resources. In some cases, the first set of narrowband random access parameters supports different random access resource configurations associated with one or more repetitions of a preamble repetition unit (PRU) than the second set of narrowband random access parameters. In some cases, a maximum number of preamble repetitions supported by the first set of narrowband random access parameters is less than the maximum number of repetitions supported by the second set of narrowband random access parameters for at least a subset of random access preamble configurations.

The random access manager 1015 may select, based on the receiving, one or more narrowband random access parameters from the first set of narrowband random access parameters for a random access message to be transmitted to the base station via a satellite link of the non-terrestrial network. In some cases, the transmitting the random access message further includes transmitting one or more further random access messages over the satellite link according to a configuration for periodic contention-free random access message transmissions. In some cases, the configuration for periodic contention-free random access resources is received from the base station in radio resource control signaling and activated based on activation signaling received in one or more of a medium access control (MAC) control element or a downlink control information communication from the base station. In some cases, the activation signaling includes information for adjustment of one or more parameters associated with the one or more further random access messages.

The NTN communications manager 1020 may transmit the random access message to the base station via the satellite link using the selected narrowband random access parameters.

The random access parameter manager 1025 may adjacent starting subcarriers of the first set of starting subcarriers have a first frequency spacing that is larger than a second frequency spacing between adjacent starting subcarriers of the second set of starting subcarriers. In some cases, the first set of narrowband random access parameters include a first set of starting subcarriers allocated for contention-based random access preambles and is different from a second set of starting subcarriers allocated for contention-based random access preambles in the second set of narrowband random access parameters. In some cases, the first set of starting subcarriers allocated for contention-based random access preambles has fewer available starting subcarriers per unit of frequency than the second set of starting subcarriers. In some cases, the first set of starting subcarriers allocated for contention-based random access preambles has a different range of starting subcarriers within a total number of available starting subcarriers than the second set of starting subcarriers. In some cases, the first set of starting subcarriers includes one or more starting subcarriers that are allocated for contention-free random access preambles in the second set of narrowband random access parameters. In some cases, the first set of starting subcarriers allocated for contention-based random access corresponds to a subset of the second set of starting subcarriers. In some cases, the first set of starting subcarriers are selected from the second set of starting subcarriers based on one or more of a starting subcarrier index value or a pattern of starting subcarriers from the second set of starting subcarriers.

In some cases, the first set of starting subcarriers allocated for contention-based random access corresponds to a subset of a total number of available starting subcarriers allocated for contention-based and contention-free random access preambles in the second set of narrowband random access parameters. In some cases, the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles. In some cases, at least one intra-PRU hopping pattern provides that two random access preambles that are adjacent in frequency in a first portion of the PRU are non-adjacent in frequency in a second part of the PRU. In some cases, one or more preamble formats, preamble subcarrier spacings, or any combinations thereof of the second candidate set of random access preambles are precluded from the first candidate set of random access preambles.

In some cases, the first subset of narrowband random access parameters use random access parameters that are identical to those of terrestrial random access messages and the second subset of narrowband random access parameters use random access parameters specific to non-terrestrial random access messages. In some cases, the random access parameters include one or more of a set of starting subcarrier indices, a frequency hopping pattern for random access preambles, a subcarrier spacing, a number of subcarriers spanned in frequency, or any combinations thereof.

The DCI manager 1030 may receive, from the base station, in response to the random access message, a physical layer downlink control information communication that provides one or more of a time or frequency correction command for communications via the satellite link.

Figure 11:
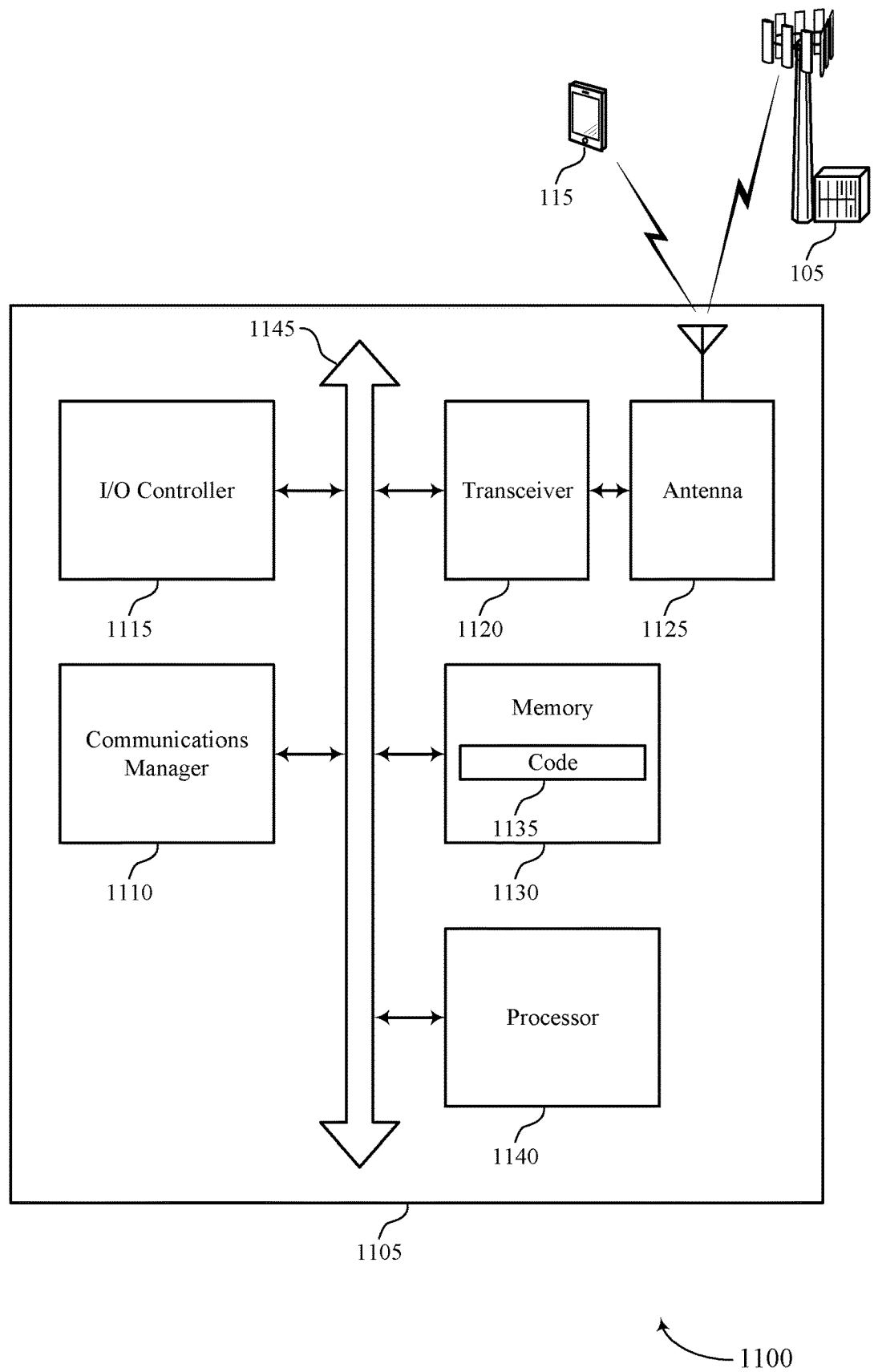
FIG. 11 shows a diagram of a system including a device that supports narrowband random access preambles for non-terrestrial network communications in accordance with aspects of the present disclosure.

FIG. 11 shows a diagram of a system 1100 including a device 1105 that supports narrowband random access preambles for non-terrestrial network communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, configuration information for a first set of narrowband random access parameters corresponding to random access messages transmitted over a non-terrestrial network that is different from a second set of narrowband random access parameters for random access messages transmitted over a terrestrial network, select, based on the receiving, one or more narrowband random access parameters from the first set of narrowband random access parameters for a random access message to be transmitted to the base station via a satellite link of the non-terrestrial network, and transmit the random access message to the base station via the satellite link using the selected narrowband random access parameters.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting narrowband random access preambles for non-terrestrial network communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
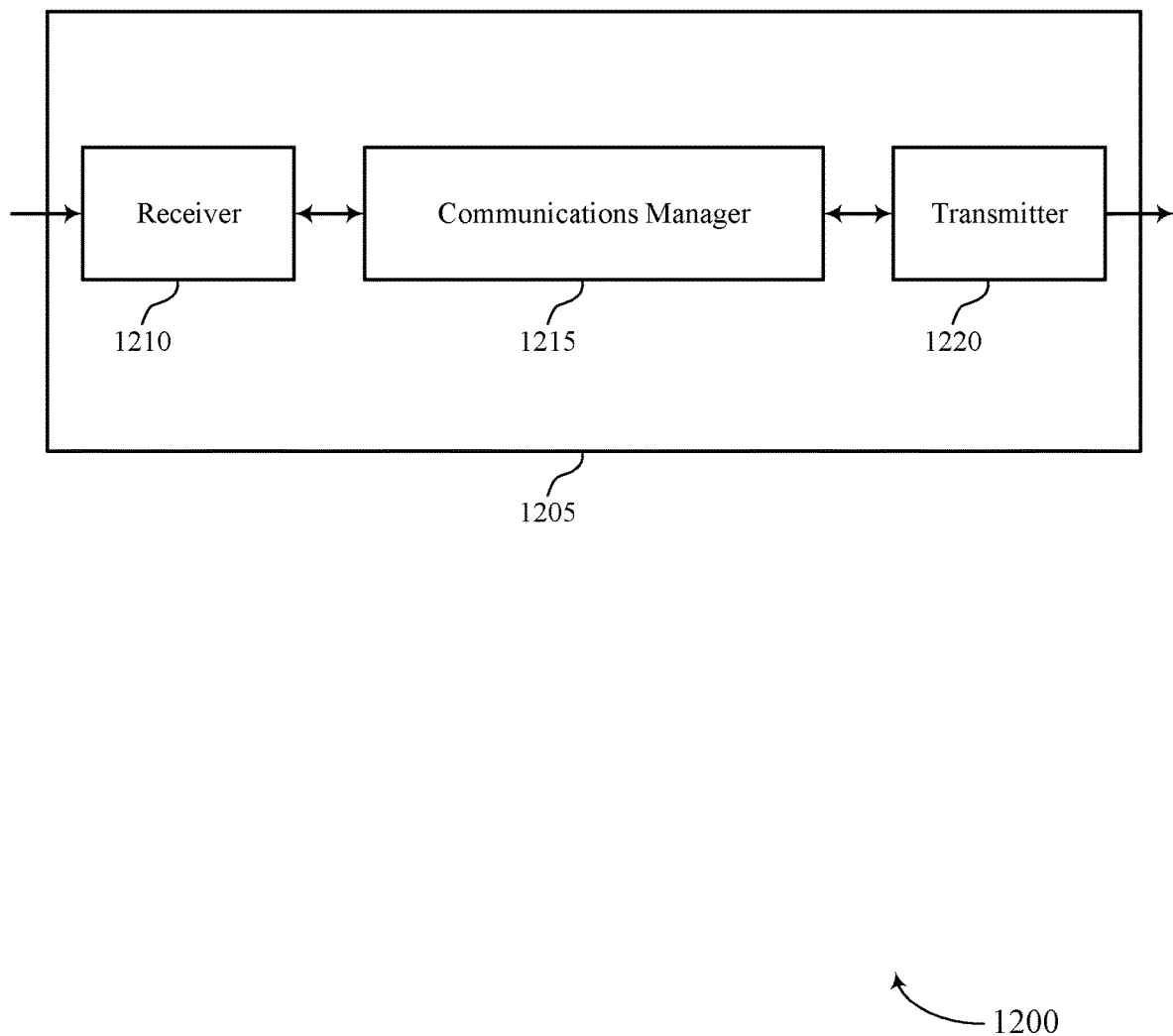
FIGS. 12 and 13 show block diagrams of devices that support narrowband random access preambles for non-terrestrial network communications in accordance with aspects of the present disclosure.

FIG. 12 shows a block diagram 1200 of a device 1205 that supports narrowband random access preambles for non-terrestrial network communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to narrowband random access preambles for non-terrestrial network communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, configuration information for a first set of narrowband random access parameters corresponding to random access messages transmitted over a non-terrestrial network that is different from a second set of narrowband random access parameters for random access messages transmitted over a terrestrial network, detect one or more random access messages from the UE via a satellite link of the non-terrestrial network based on the first set of narrowband random access parameters, and transmit a random access response to the UE via the satellite link responsive to the detecting. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
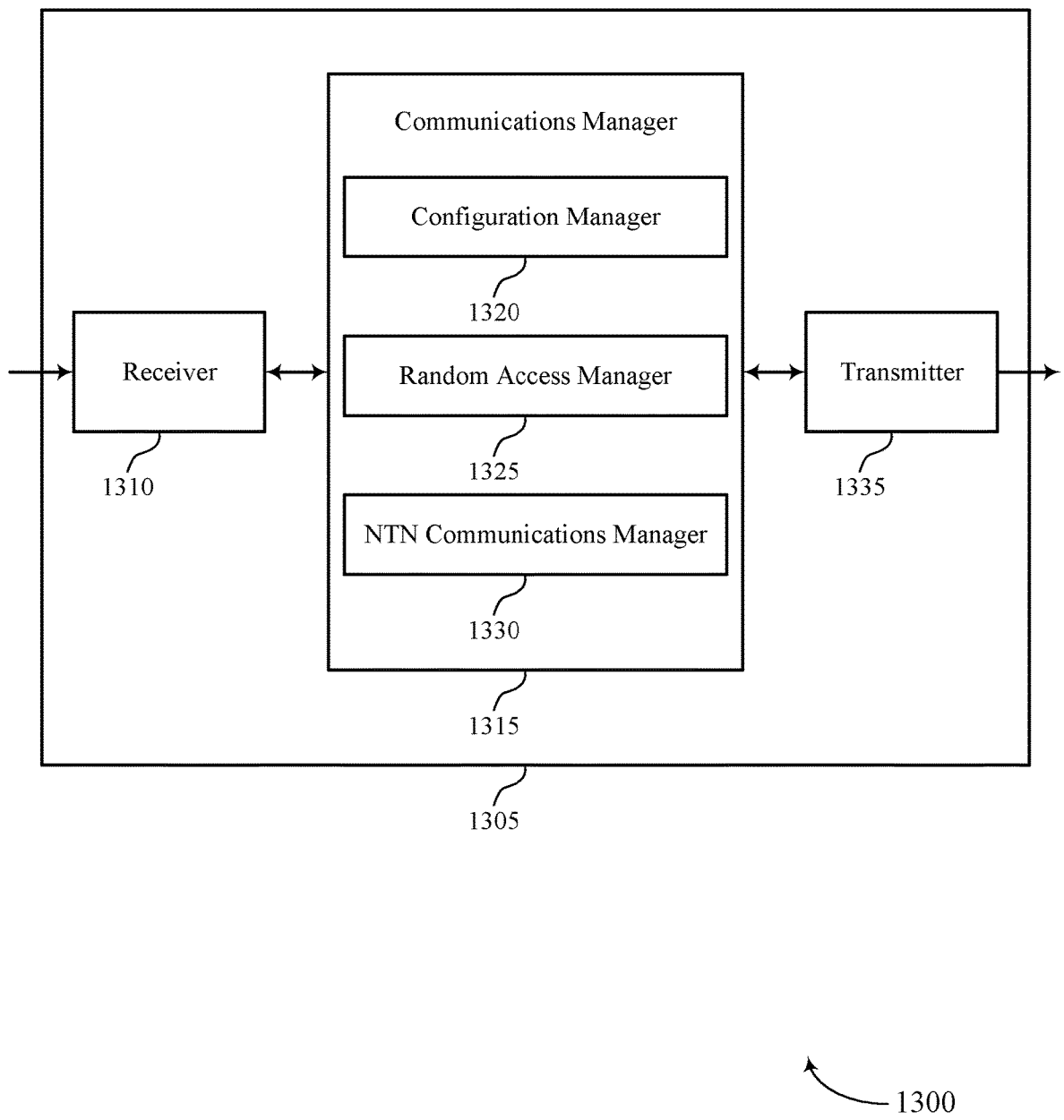

FIG. 13 shows a block diagram 1300 of a device 1305 that supports narrowband random access preambles for non-terrestrial network communications in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to narrowband random access preambles for non-terrestrial network communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320, a random access manager 1325, and a NTN communications manager 1330. The communications manager 1315 may be an example of aspects of the communications manager 1510 described herein.

The configuration manager 1320 may transmit, to a UE, configuration information for a first set of narrowband random access parameters corresponding to random access messages transmitted over a non-terrestrial network that is different from a second set of narrowband random access parameters for random access messages transmitted over a terrestrial network.

The random access manager 1325 may detect one or more random access messages from the UE via a satellite link of the non-terrestrial network based on the first set of narrowband random access parameters.

The NTN communications manager 1330 may transmit a random access response to the UE via the satellite link responsive to the detecting.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
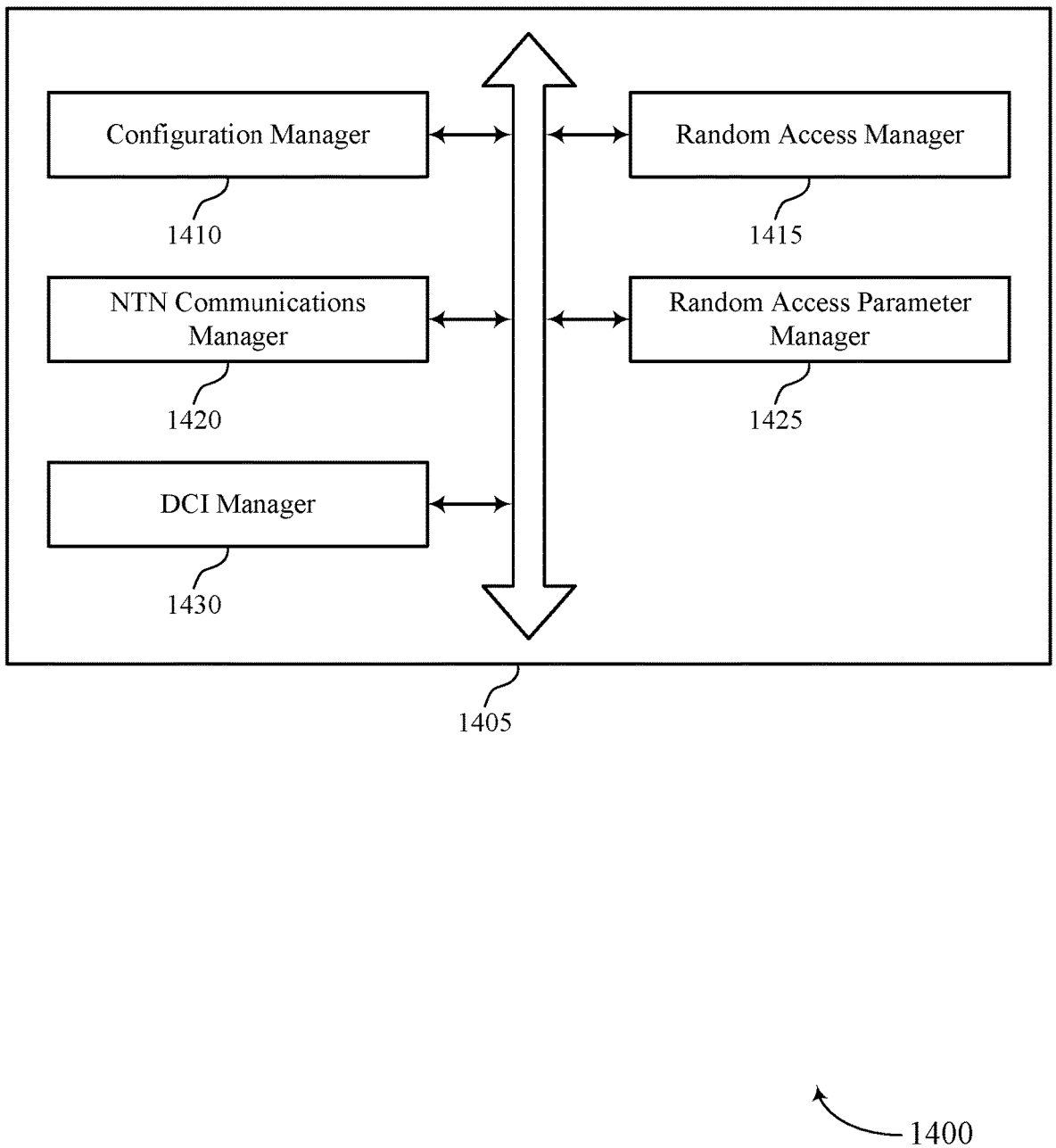
FIG. 14 shows a block diagram of a communications manager that supports narrowband random access preambles for non-terrestrial network communications in accordance with aspects of the present disclosure.

FIG. 14 shows a block diagram 1400 of a communications manager 1405 that supports narrowband random access preambles for non-terrestrial network communications in accordance with aspects of the present disclosure. The communications manager 1405 may be an example of aspects of a communications manager 1215, a communications manager 1315, or a communications manager 1510 described herein. The communications manager 1405 may include a configuration manager 1410, a random access manager 1415, a NTN communications manager 1420, a random access parameter manager 1425, and a DCI manager 1430. Each of these modules may communicate, directly or indirectly, with one another (e.g., via one or more buses).

The configuration manager 1410 may transmit, to a UE, configuration information for a first set of narrowband random access parameters corresponding to random access messages transmitted over a non-terrestrial network that is different from a second set of narrowband random access parameters for random access messages transmitted over a terrestrial network.

In some examples, the configuration manager 1410 may transmit an indication of a first subset of the first set of narrowband random access parameters that provide contention-free random access resources and a second subset of the first set of narrowband random access parameters that provide contention-based random access resources, where the contention-free random access resources have one or more parameters that are different than corresponding parameters of the contention-based random access resources. In some cases, the first set of narrowband random access parameters include a first set of random access preambles for contention-based random access that have one or more different characteristics than a second set of random access preambles of the second set of narrowband random access parameters. In some cases, the configuration for periodic contention-free random access resources is transmitted to the UE in radio resource control signaling and activated based on activation signaling transmitted in one or more of a medium access control (MAC) control element or a downlink control information communication from the base station. In some cases, the activation signaling includes information for adjustment of one or more parameters associated with the one or more further random access messages. In some cases, the first set of narrowband random access parameters supports different random access resource configurations associated with one or more repetitions of a preamble repetition unit (PRU) than the second set of narrowband random access parameters. In some cases, a maximum number of preamble repetitions supported by the first set of narrowband random access parameters is less than the maximum number of repetitions supported by the second set of narrowband random access parameters for at least a subset of random access preamble configurations.

The random access manager 1415 may detect one or more random access messages from the UE via a satellite link of the non-terrestrial network based on the first set of narrowband random access parameters. In some cases, the receiving the random access message further includes receiving one or more further random access messages over the satellite link according to a configuration for periodic contention-free random access message transmissions.

The NTN communications manager 1420 may transmit a random access response to the UE via the satellite link responsive to the detecting.

The random access parameter manager 1425 may adjacent starting subcarriers of the first set of starting subcarriers have a first frequency spacing that is larger than a second frequency spacing between adjacent starting subcarriers of the second set of starting subcarriers. In some cases, the first set of narrowband random access parameters include a first set of starting subcarriers allocated for contention-based random access preambles and is different from a second set of starting subcarriers allocated for contention-based random access preambles in the second set of narrowband random access parameters. In some cases, the first set of starting subcarriers allocated for contention-based random access preambles has fewer available starting subcarriers per unit of frequency than the second set of starting subcarriers. In some cases, the first set of starting subcarriers allocated for contention-based random access preambles has a different range of starting subcarriers within a total number of available starting subcarriers than the second set of starting subcarriers. In some cases, the first set of starting subcarriers includes one or more starting subcarriers that are allocated for contention-free random access preambles in the second set of narrowband random access parameters. In some cases, the first set of starting subcarriers allocated for contention-based random access corresponds to a subset of the second set of starting subcarriers. In some cases, the first set of starting subcarriers are selected from the second set of starting subcarriers based on one or more of a starting subcarrier index value or a pattern of starting subcarriers from the second set of starting subcarriers. In some cases, the first set of starting subcarriers allocated for contention-based random access corresponds to a subset of a total number of available starting subcarriers allocated for contention-based and contention-free random access preambles in the second set of narrowband random access parameters.

In some cases, the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles. In some cases, at least one intra-PRU hopping pattern provides that two random access preambles that are adjacent in frequency in a first portion of the PRU are non-adjacent in frequency in a second part of the PRU.

In some cases, the first set of random access preambles are configured from a first candidate set of random access preambles and the second set of random access preambles are configured from a second candidate set of random access preambles, where the first candidate set of preambles is a subset of the second candidate set of random access preambles. In some cases, one or more preamble formats, preamble subcarrier spacings, or any combinations thereof of the second candidate set of random access preambles are precluded from the first candidate set of random access preambles. In some cases, the first subset of narrowband random access parameters use random access parameters that are identical to those of terrestrial random access messages and the second subset of narrowband random access parameters use random access parameters specific to non-terrestrial random access messages. In some cases, the random access parameters include one or more of a set of starting subcarrier indices, a frequency hopping pattern for random access preambles, a subcarrier spacing, a number of subcarriers spanned in frequency, or any combinations thereof.

In some cases, the first set of narrowband random access parameters include a first subset of narrowband random access parameters that correspond to terrestrial network narrowband random access parameters and a second subset of narrowband random access parameters that are different than terrestrial network narrowband random access parameters. In some cases, the first subset of narrowband random access parameters and the second subset of narrowband random access parameters are located in a same set of frequency resources and in different time resources, in different sets of frequency resources and a same set of time resources, or in different frequency and time resources.

The DCI manager 1430 may transmit, to the UE, in response to the random access message, a physical layer downlink control information communication that provides one or more of a time or frequency correction command for communications via the satellite link.

Figure 15:
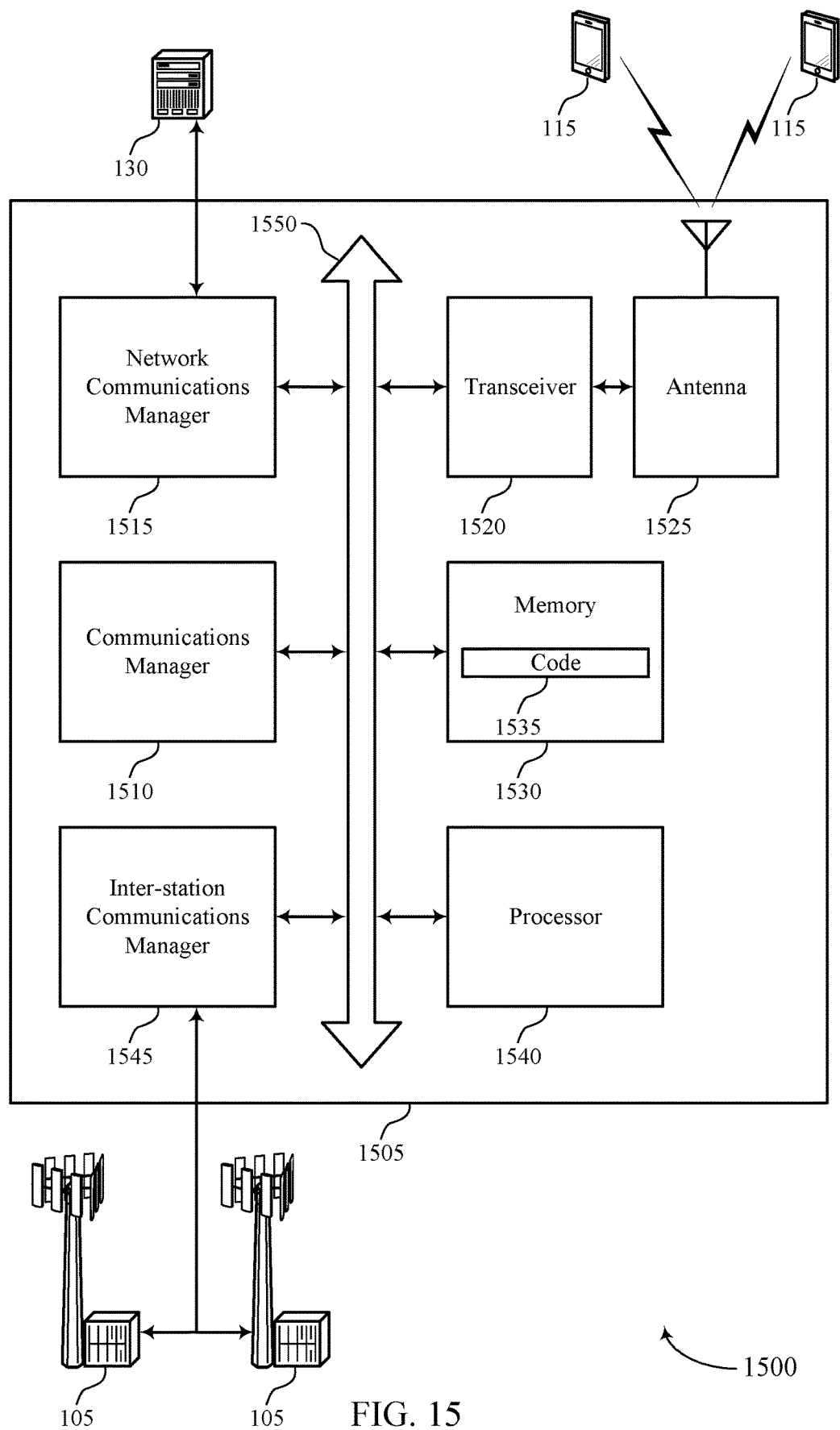
FIG. 15 shows a diagram of a system including a device that supports narrowband random access preambles for non-terrestrial network communications in accordance with aspects of the present disclosure.

FIG. 15 shows a diagram of a system 1500 including a device 1505 that supports narrowband random access preambles for non-terrestrial network communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, configuration information for a first set of narrowband random access parameters corresponding to random access messages transmitted over a non-terrestrial network that is different from a second set of narrowband random access parameters for random access messages transmitted over a terrestrial network, detect one or more random access messages from the UE via a satellite link of the non-terrestrial network based on the first set of narrowband random access parameters, and transmit a random access response to the UE via the satellite link responsive to the detecting.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting narrowband random access preambles for non-terrestrial network communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
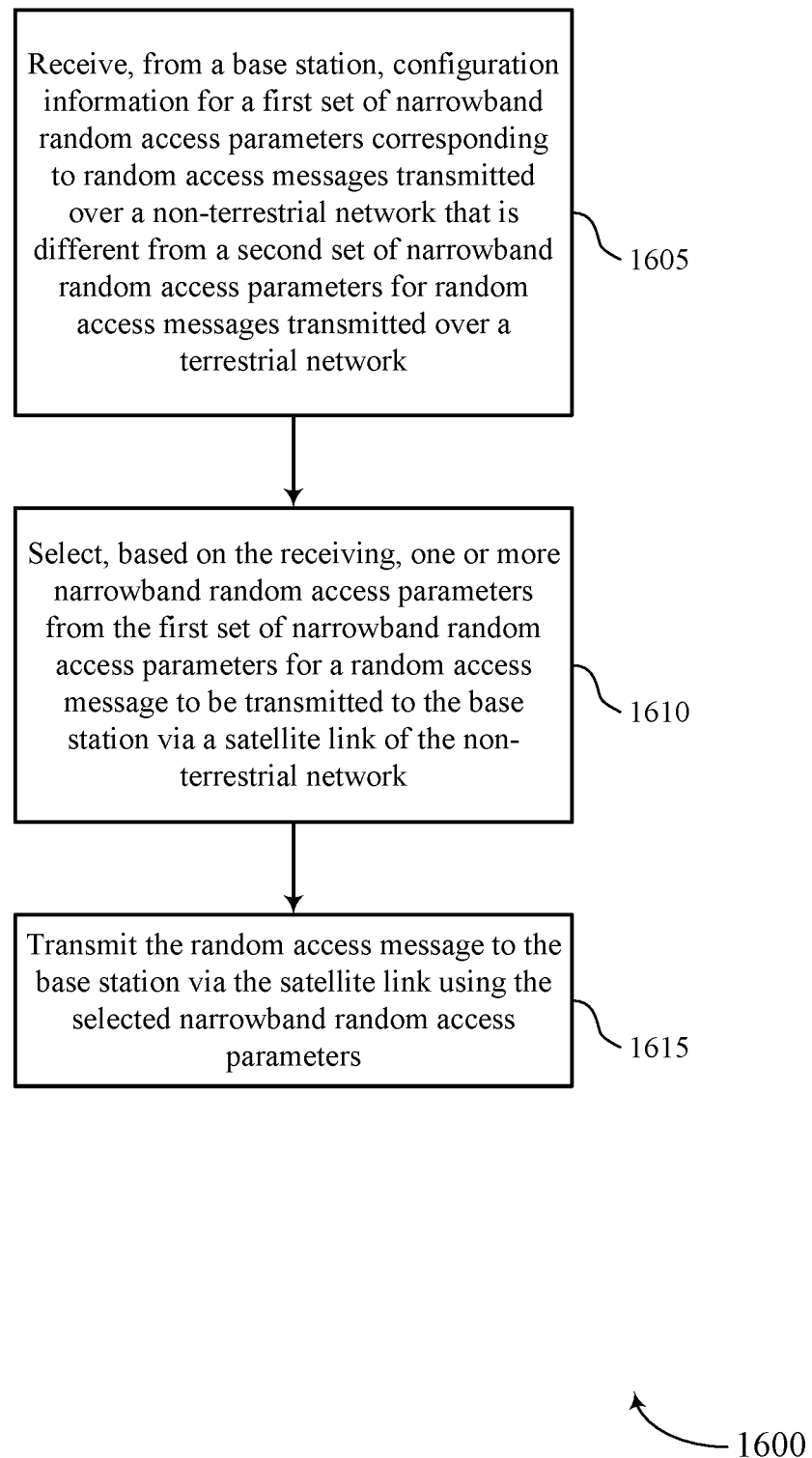
FIGS. 16 through 22 show flowcharts illustrating methods that support narrowband random access preambles for non-terrestrial network communications in accordance with aspects of the present disclosure.

FIG. 16 shows a flowchart illustrating a method 1600 that supports narrowband random access preambles for non-terrestrial network communications in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for a first set of narrowband random access parameters corresponding to random access messages transmitted over a non-terrestrial network that is different from a second set of narrowband random access parameters for random access messages transmitted over a terrestrial network. The operations of 1605 may be performed according to the methods described herein. In some examples, aspects of the operations of 1605 may be performed by a configuration manager as described with reference to FIGS. 8 through 11.

At 1610, the UE may select, based on the receiving, one or more narrowband random access parameters from the first set of narrowband random access parameters for a random access message to be transmitted to the base station via a satellite link of the non-terrestrial network. The operations of 1610 may be performed according to the methods described herein. In some examples, aspects of the operations of 1610 may be performed by a random access manager as described with reference to FIGS. 8 through 11.

At 1615, the UE may transmit the random access message to the base station via the satellite link using the selected narrowband random access parameters. The operations of 1615 may be performed according to the methods described herein. In some examples, aspects of the operations of 1615 may be performed by a NTN communications manager as described with reference to FIGS. 8 through 11.

Figure 17:
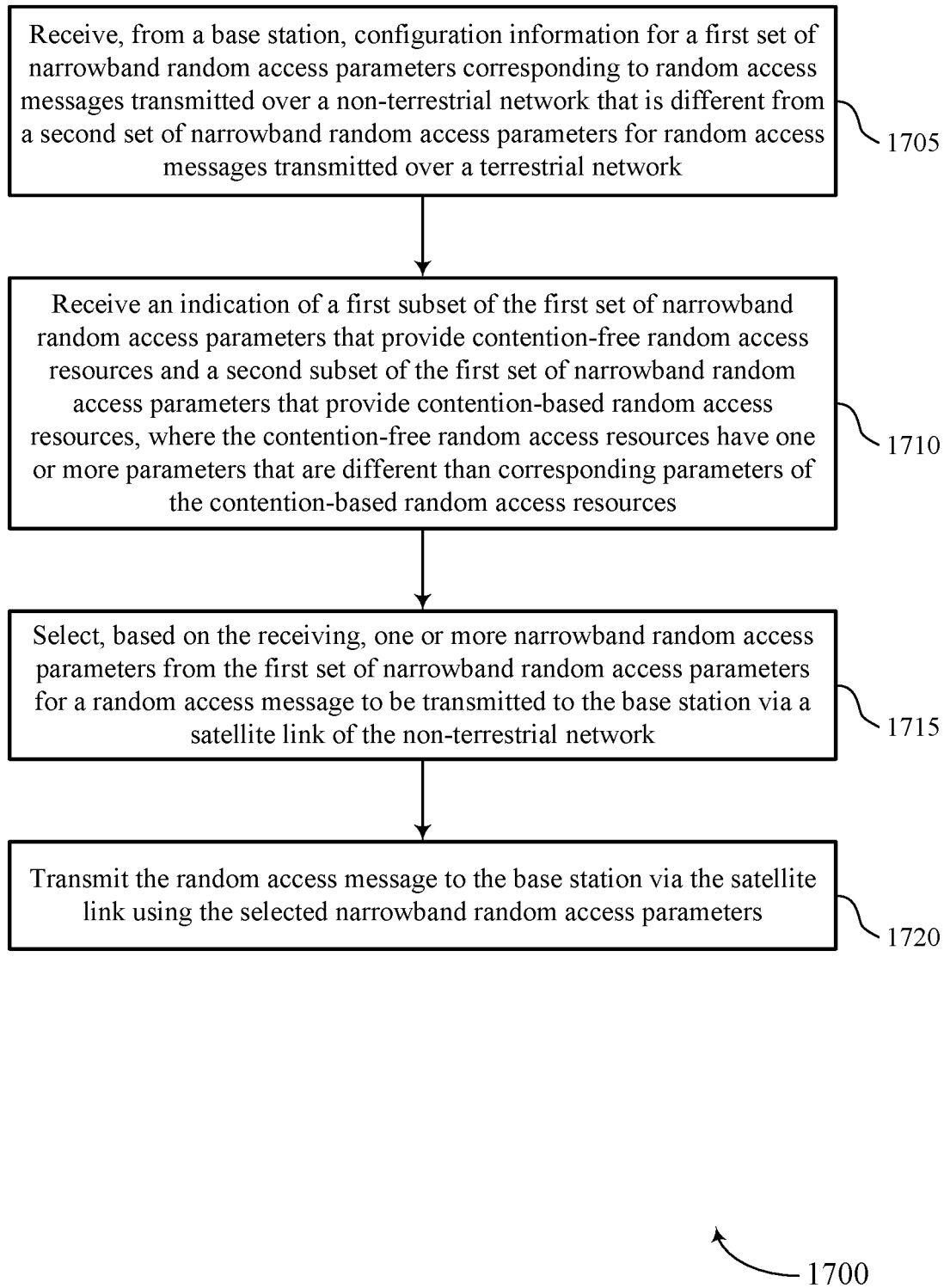

FIG. 17 shows a flowchart illustrating a method 1700 that supports narrowband random access preambles for non-terrestrial network communications in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, configuration information for a first set of narrowband random access parameters corresponding to random access messages transmitted over a non-terrestrial network that is different from a second set of narrowband random access parameters for random access messages transmitted over a terrestrial network. The operations of 1705 may be performed according to the methods described herein. In some examples, aspects of the operations of 1705 may be performed by a configuration manager as described with reference to FIGS. 8 through 11.

At 1710, the UE may receive an indication of a first subset of the first set of narrowband random access parameters that provide contention-free random access resources and a second subset of the first set of narrowband random access parameters that provide contention-based random access resources, where the contention-free random access resources have one or more parameters that are different than corresponding parameters of the contention-based random access resources. The operations of 1710 may be performed according to the methods described herein. In some examples, aspects of the operations of 1710 may be performed by a configuration manager as described with reference to FIGS. 8 through 11.

At 1715, the UE may select, based on the receiving, one or more narrowband random access parameters from the first set of narrowband random access parameters for a random access message to be transmitted to the base station via a satellite link of the non-terrestrial network. The operations of 1715 may be performed according to the methods described herein. In some examples, aspects of the operations of 1715 may be performed by a random access manager as described with reference to FIGS. 8 through 11.

At 1720, the UE may transmit the random access message to the base station via the satellite link using the selected narrowband random access parameters. The operations of 1720 may be performed according to the methods described herein. In some examples, aspects of the operations of 1720 may be performed by a NTN communications manager as described with reference to FIGS. 8 through 11.

Figure 18:
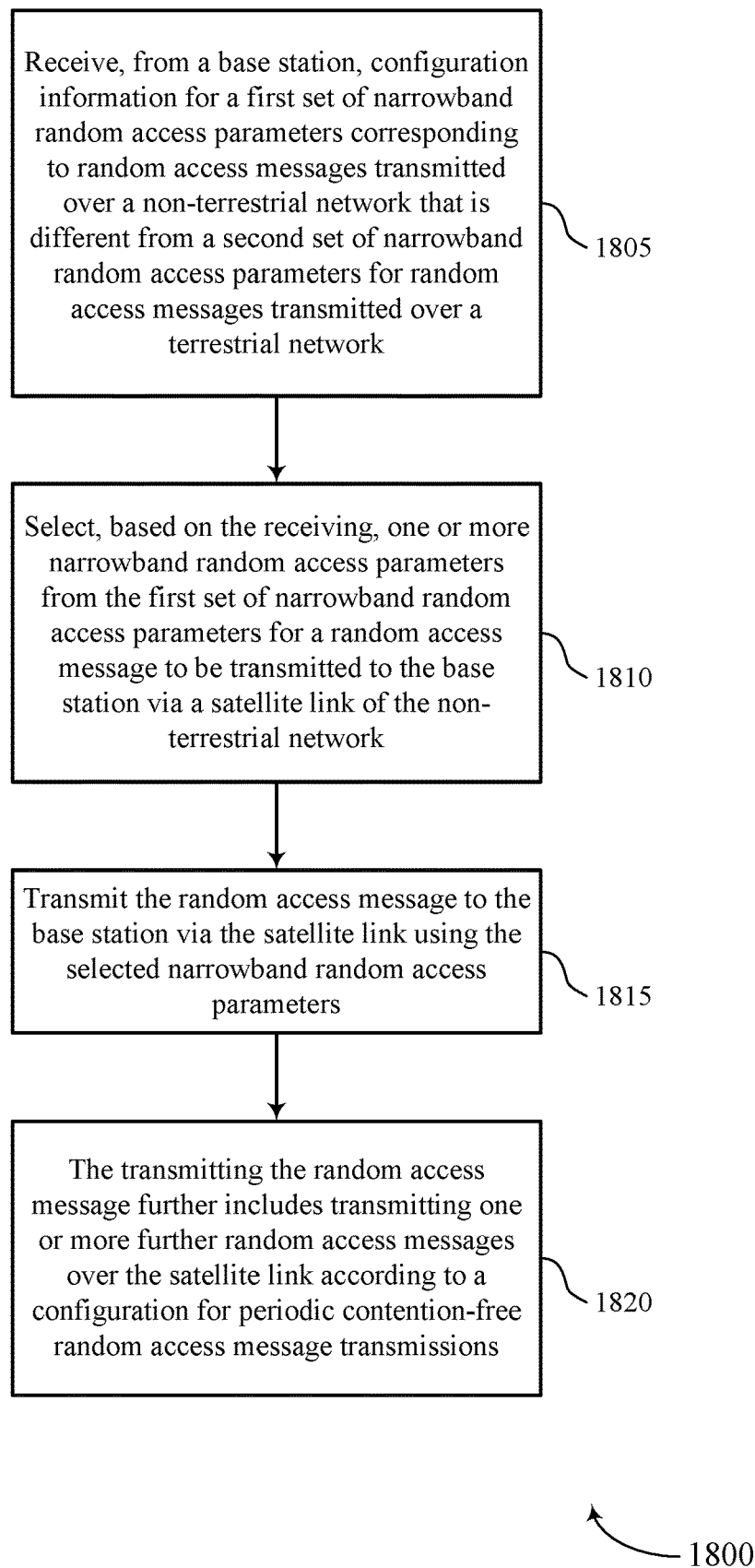

FIG. 18 shows a flowchart illustrating a method 1800 that supports narrowband random access preambles for non-terrestrial network communications in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, configuration information for a first set of narrowband random access parameters corresponding to random access messages transmitted over a non-terrestrial network that is different from a second set of narrowband random access parameters for random access messages transmitted over a terrestrial network. The operations of 1805 may be performed according to the methods described herein. In some examples, aspects of the operations of 1805 may be performed by a configuration manager as described with reference to FIGS. 8 through 11.

At 1810, the UE may select, based on the receiving, one or more narrowband random access parameters from the first set of narrowband random access parameters for a random access message to be transmitted to the base station via a satellite link of the non-terrestrial network. The operations of 1810 may be performed according to the methods described herein. In some examples, aspects of the operations of 1810 may be performed by a random access manager as described with reference to FIGS. 8 through 11.

At 1815, the UE may transmit the random access message to the base station via the satellite link using the selected narrowband random access parameters. The operations of 1815 may be performed according to the methods described herein. In some examples, aspects of the operations of 1815 may be performed by a NTN communications manager as described with reference to FIGS. 8 through 11.

At 1820, the UE may the transmitting the random access message further includes transmitting one or more further random access messages over the satellite link according to a configuration for periodic contention-free random access message transmissions. The operations of 1820 may be performed according to the methods described herein. In some examples, aspects of the operations of 1820 may be performed by a random access manager as described with reference to FIGS. 8 through 11.

Figure 19:
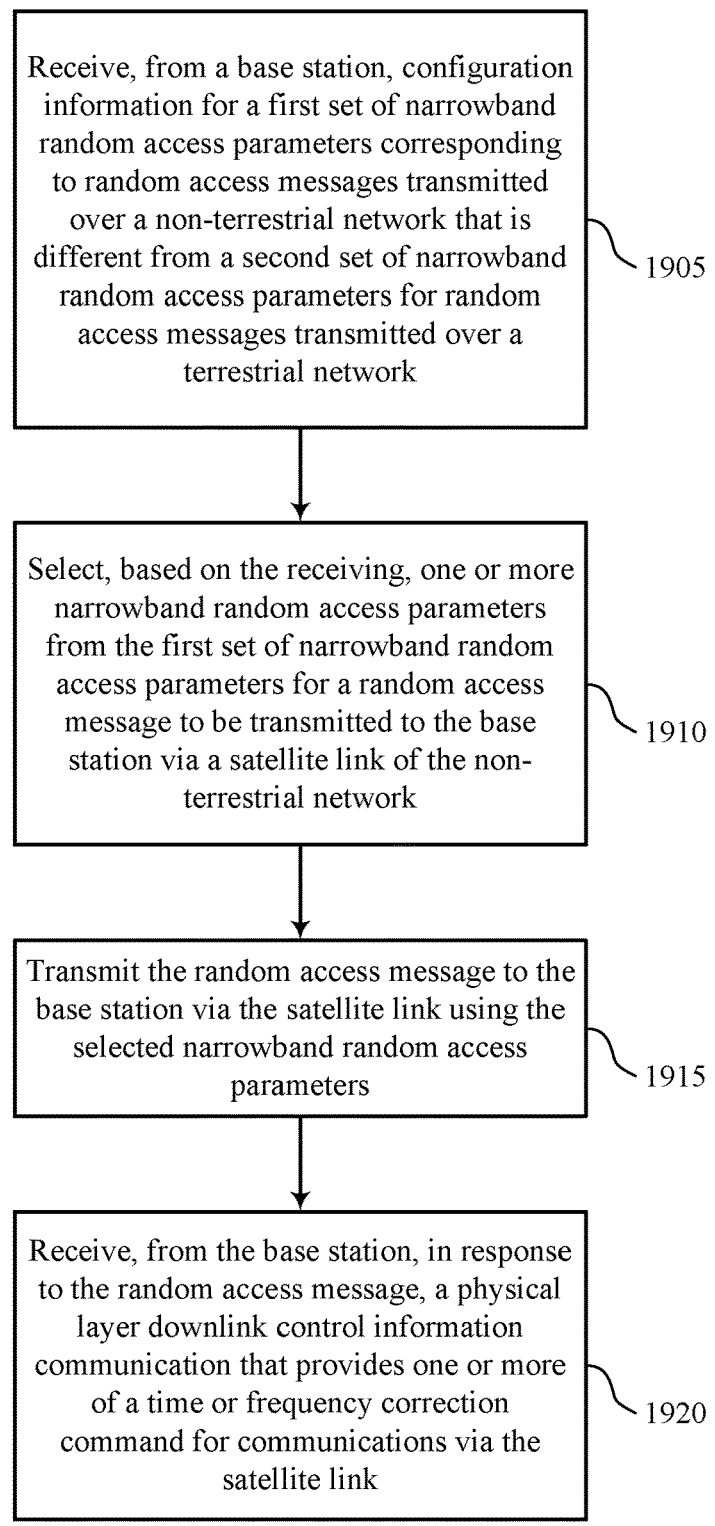

FIG. 19 shows a flowchart illustrating a method 1900 that supports narrowband random access preambles for non-terrestrial network communications in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, configuration information for a first set of narrowband random access parameters corresponding to random access messages transmitted over a non-terrestrial network that is different from a second set of narrowband random access parameters for random access messages transmitted over a terrestrial network. The operations of 1905 may be performed according to the methods described herein. In some examples, aspects of the operations of 1905 may be performed by a configuration manager as described with reference to FIGS. 8 through 11.

At 1910, the UE may select, based on the receiving, one or more narrowband random access parameters from the first set of narrowband random access parameters for a random access message to be transmitted to the base station via a satellite link of the non-terrestrial network. The operations of 1910 may be performed according to the methods described herein. In some examples, aspects of the operations of 1910 may be performed by a random access manager as described with reference to FIGS. 8 through 11.

At 1915, the UE may transmit the random access message to the base station via the satellite link using the selected narrowband random access parameters. The operations of 1915 may be performed according to the methods described herein. In some examples, aspects of the operations of 1915 may be performed by a NTN communications manager as described with reference to FIGS. 8 through 11.

At 1920, the UE may receive, from the base station, in response to the random access message, a physical layer downlink control information communication that provides one or more of a time or frequency correction command for communications via the satellite link. The operations of 1920 may be performed according to the methods described herein. In some examples, aspects of the operations of 1920 may be performed by a DCI manager as described with reference to FIGS. 8 through 11.

Figure 20:
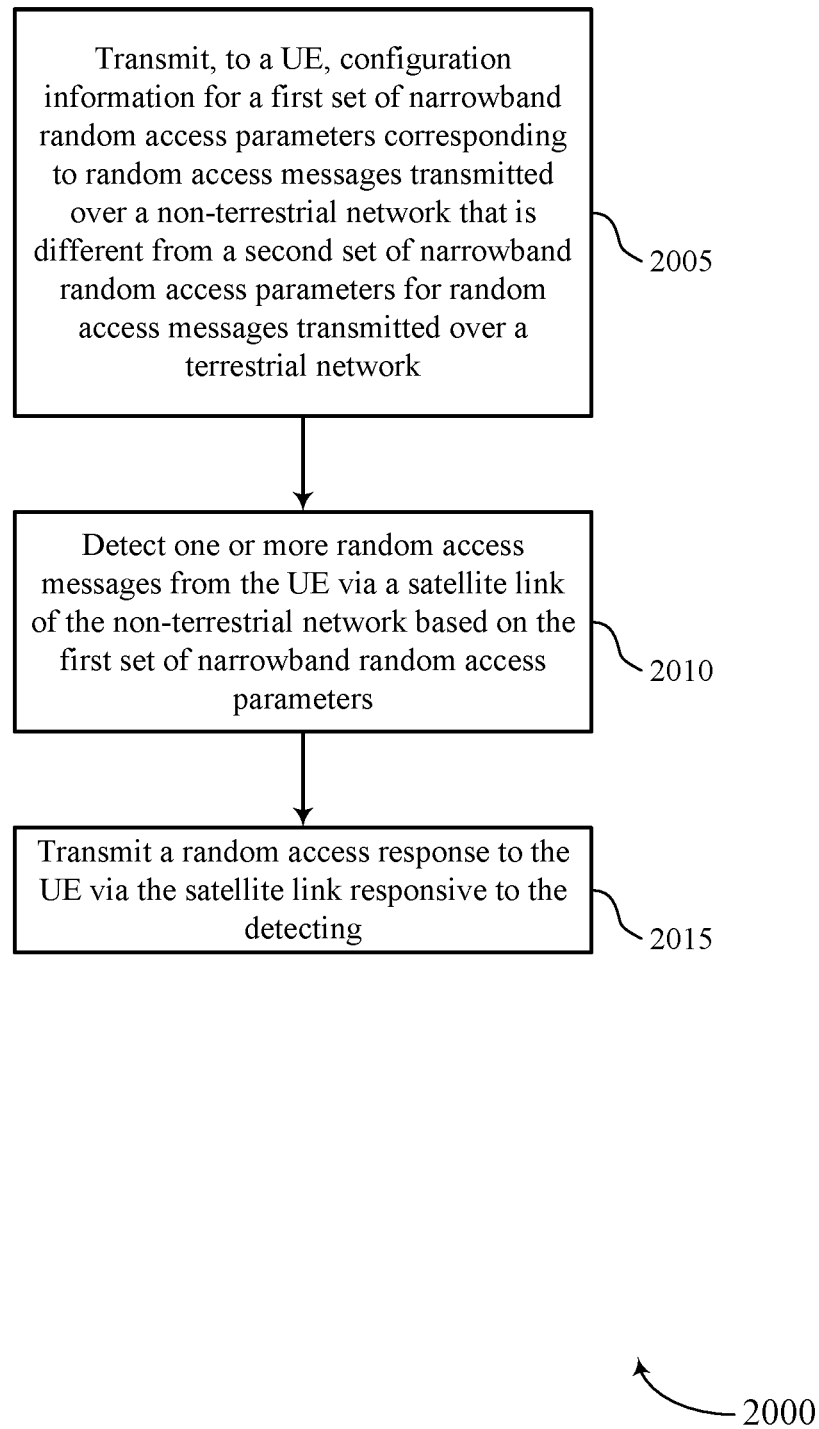

FIG. 20 shows a flowchart illustrating a method 2000 that supports narrowband random access preambles for non-terrestrial network communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, configuration information for a first set of narrowband random access parameters corresponding to random access messages transmitted over a non-terrestrial network that is different from a second set of narrowband random access parameters for random access messages transmitted over a terrestrial network. The operations of 2005 may be performed according to the methods described herein. In some examples, aspects of the operations of 2005 may be performed by a configuration manager as described with reference to FIGS. 12 through 15.

At 2010, the base station may detect one or more random access messages from the UE via a satellite link of the non-terrestrial network based on the first set of narrowband random access parameters. The operations of 2010 may be performed according to the methods described herein. In some examples, aspects of the operations of 2010 may be performed by a random access manager as described with reference to FIGS. 12 through 15.

At 2015, the base station may transmit a random access response to the UE via the satellite link responsive to the detecting. The operations of 2015 may be performed according to the methods described herein. In some examples, aspects of the operations of 2015 may be performed by a NTN communications manager as described with reference to FIGS. 12 through 15.

Figure 21:
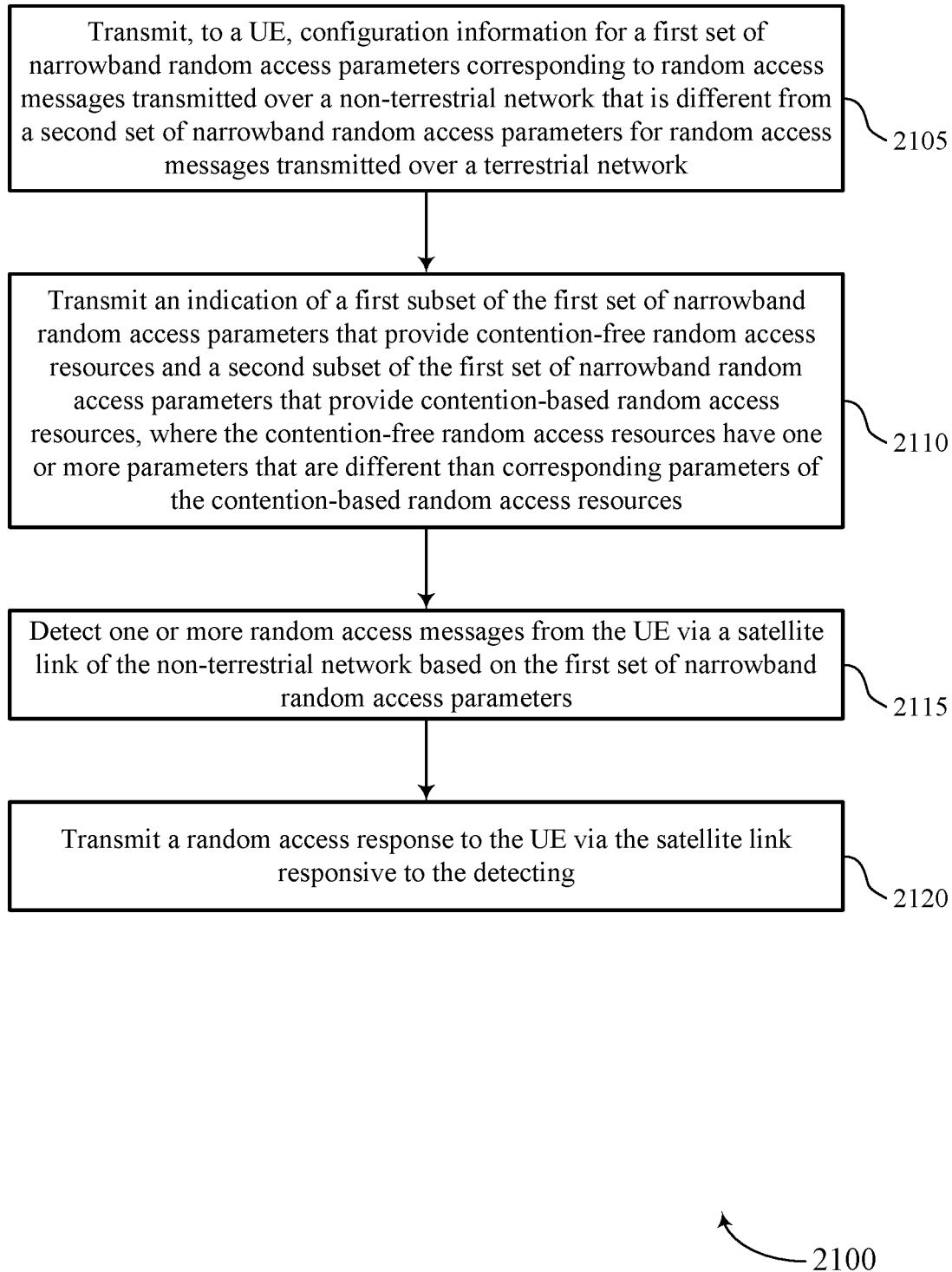

FIG. 21 shows a flowchart illustrating a method 2100 that supports narrowband random access preambles for non-terrestrial network communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, configuration information for a first set of narrowband random access parameters corresponding to random access messages transmitted over a non-terrestrial network that is different from a second set of narrowband random access parameters for random access messages transmitted over a terrestrial network. The operations of 2105 may be performed according to the methods described herein. In some examples, aspects of the operations of 2105 may be performed by a configuration manager as described with reference to FIGS. 12 through 15.

At 2110, the base station may transmit an indication of a first subset of the first set of narrowband random access parameters that provide contention-free random access resources and a second subset of the first set of narrowband random access parameters that provide contention-based random access resources, where the contention-free random access resources have one or more parameters that are different than corresponding parameters of the contention-based random access resources. The operations of 2110 may be performed according to the methods described herein. In some examples, aspects of the operations of 2110 may be performed by a configuration manager as described with reference to FIGS. 12 through 15.

At 2115, the base station may detect one or more random access messages from the UE via a satellite link of the non-terrestrial network based on the first set of narrowband random access parameters. The operations of 2115 may be performed according to the methods described herein. In some examples, aspects of the operations of 2115 may be performed by a random access manager as described with reference to FIGS. 12 through 15.

At 2120, the base station may transmit a random access response to the UE via the satellite link responsive to the detecting. The operations of 2120 may be performed according to the methods described herein. In some examples, aspects of the operations of 2120 may be performed by a NTN communications manager as described with reference to FIGS. 12 through 15.

Figure 22:
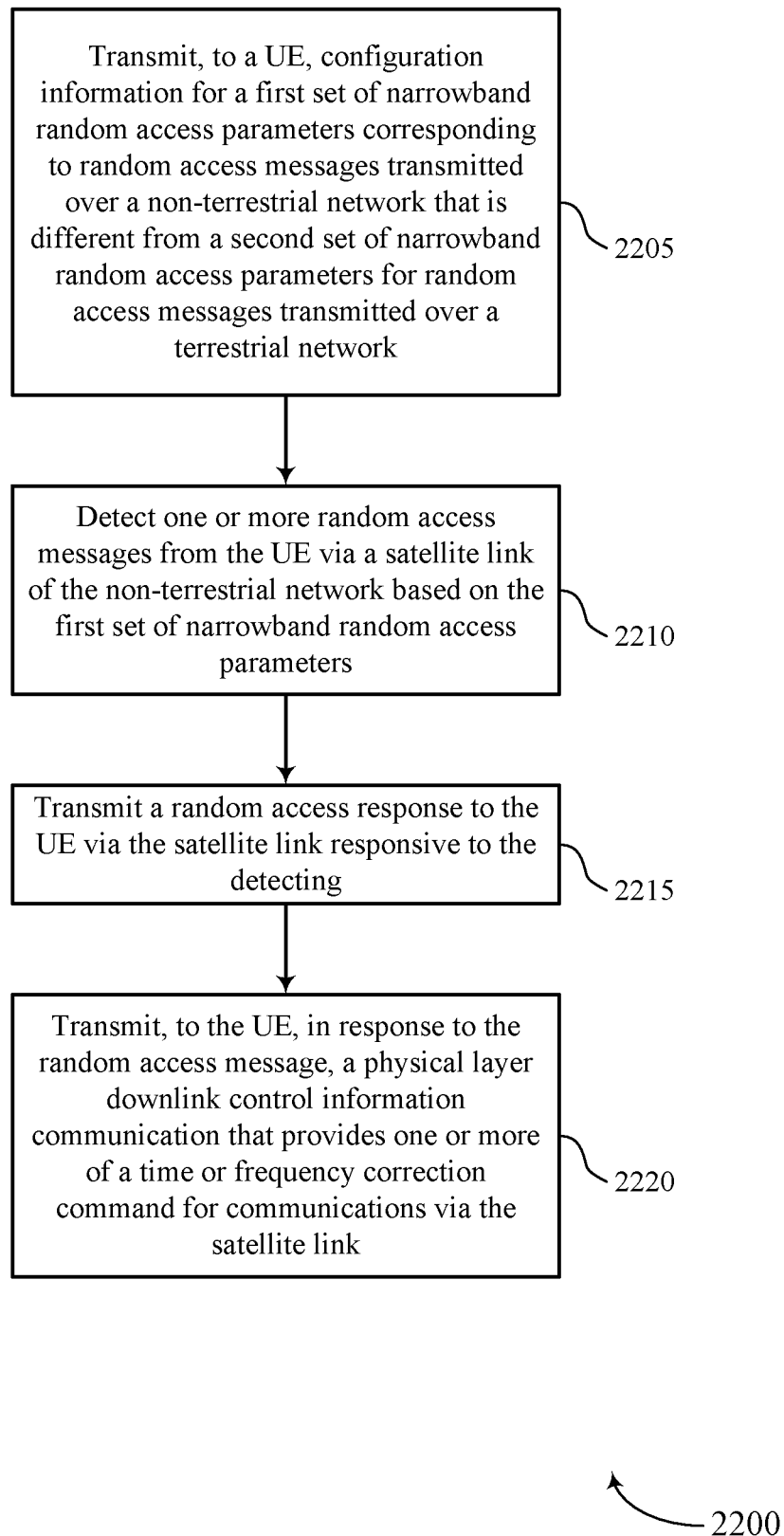

FIG. 22 shows a flowchart illustrating a method 2200 that supports narrowband random access preambles for non-terrestrial network communications in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, configuration information for a first set of narrowband random access parameters corresponding to random access messages transmitted over a non-terrestrial network that is different from a second set of narrowband random access parameters for random access messages transmitted over a terrestrial network. The operations of 2205 may be performed according to the methods described herein. In some examples, aspects of the operations of 2205 may be performed by a configuration manager as described with reference to FIGS. 12 through 15.

At 2210, the base station may detect one or more random access messages from the UE via a satellite link of the non-terrestrial network based on the first set of narrowband random access parameters. The operations of 2210 may be performed according to the methods described herein. In some examples, aspects of the operations of 2210 may be performed by a random access manager as described with reference to FIGS. 12 through 15.

At 2215, the base station may transmit a random access response to the UE via the satellite link responsive to the detecting. The operations of 2215 may be performed according to the methods described herein. In some examples, aspects of the operations of 2215 may be performed by a NTN communications manager as described with reference to FIGS. 12 through 15.

At 2220, the base station may transmit, to the UE, in response to the random access message, a physical layer downlink control information communication that provides one or more of a time or frequency correction command for communications via the satellite link. The operations of 2220 may be performed according to the methods described herein. In some examples, aspects of the operations of 2220 may be performed by a DCI manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, configuration information for a first set of narrowband random access parameters corresponding to random access messages transmitted over a non-terrestrial network that is different from a second set of narrowband random access parameters for random access messages transmitted over a terrestrial network; selecting, based at least in part on the receiving, one or more narrowband random access parameters from the first set of narrowband random access parameters for a random access message to be transmitted to the base station via a satellite link of the non-terrestrial network; and transmitting the random access message to the base station via the satellite link using the selected narrowband random access parameters.

Aspect 2: The method of aspect 1, wherein the first set of narrowband random access parameters include a first set of starting subcarriers allocated for contention-based random access preambles that is different from a second set of starting subcarriers allocated for contention-based random access preambles in the second set of narrowband random access parameters.

Aspect 3: The method of aspect 2, wherein adjacent starting subcarriers of the first set of starting subcarriers have a first frequency spacing that is larger than a second frequency spacing between adjacent starting subcarriers of the second set of starting subcarriers.

Aspect 4: The method of any of aspects 2 through 3, wherein the first set of starting subcarriers allocated for contention-based random access preambles has fewer available starting subcarriers per unit of frequency than the second set of starting subcarriers.

Aspect 5: The method of any of aspects 2 through 4, wherein the first set of starting subcarriers has a different range of starting subcarriers within a total number of available starting subcarriers for contention-based random access and contention-free random access than that of the second set of starting subcarriers.

Aspect 6: The method of any of aspects 2 through 5, wherein the first set of starting subcarriers corresponds to a subset of the second set of starting subcarriers.

Aspect 7: The method of aspect 6, wherein the first set of starting subcarriers are selected from the second set of starting subcarriers based at least in part on one or more of a starting subcarrier index value or a pattern of starting subcarriers from the second set of starting subcarriers.

Aspect 8: The method of aspect 7, wherein the pattern of starting subcarriers comprises one out of every m consecutive starting subcarriers from the second set of starting subcarriers, where m is an integer.

Aspect 9: The method of any of aspects 2 through 8, wherein the first set of starting subcarriers allocated for contention-based random access corresponds to a subset of a total number of available starting subcarriers allocated for contention-based and contention-free random access preambles in the second set of narrowband random access parameters, the first set of starting subcarriers is determined at least in part by a pattern of starting subcarriers from the second set of starting subcarriers.

Aspect 10: The method of aspect 9, wherein the pattern of starting subcarriers comprises one out of every m consecutive starting subcarriers from the total number of available starting subcarriers in the second set of narrowband random access parameters, where m is an integer.

Aspect 11: The method of any of aspects 1 through 10, wherein the first set of narrowband random access parameters include a first set of random access preambles for contention-based random access that have one or more different characteristics than a second set of random access preambles of the second set of narrowband random access parameters.

Aspect 12: The method of aspect 11, wherein the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles.

Aspect 13: The method of aspect 12, wherein at least one intra-PRU hopping pattern provides that two random access preambles that are adjacent in frequency in a first portion of the PRU are non-adjacent in frequency in a second portion of the PRU.

Aspect 14: The method of aspect 11, wherein the first set of random access preambles are configured from a first candidate set of random access preambles and the second set of random access preambles are configured from a second candidate set of random access preambles, the first candidate set of random access preambles is a subset of the second candidate set of random access preambles.

Aspect 15: The method of aspect 14, wherein one or more preamble formats, preamble subcarrier spacings, or any combinations thereof of the second candidate set of random access preambles are precluded from the first candidate set of random access preambles.

Aspect 16: The method of aspect 1, wherein the receiving the configuration information further comprises: receiving an indication of a first subset of the first set of narrowband random access parameters that provide a first subset of resources corresponding to the first subset of narrowband random access parameters and a second subset of the first set of narrowband random access parameters that provide a second subset of resources corresponding to the second subset of narrowband random access parameters, wherein the first subset of resources have one or more parameters that are different than corresponding parameters of the second subset of resources.

Aspect 17: The method of aspect 16, wherein the first subset of resources or the second subset of resources are any one of contention-based random access resources or contention-free random access resources.

Aspect 18: The method of any of aspects 16 through 17, wherein the first subset of narrowband random access parameters use random access parameters that are not different from those of terrestrial random access messages and the second subset of narrowband random access parameters use random access parameters specific to non-terrestrial random access messages.

Aspect 19: The method of any of aspects 16 through 18, wherein the narrowband random access parameters include one or more of a set of starting subcarrier indices, a frequency hopping pattern for random access preambles, a subcarrier spacing, a number of subcarriers spanned in frequency, or any combinations thereof.

Aspect 20: The method of any of aspects 16 through 19, wherein the first subset of resources and the second subset of resources are located in a same set of frequency resources and in different time resources, in different sets of frequency resources and a same set of time resources, in different frequency and time resources, or interlaced with each other within the same set of time and frequency resources.

Aspect 21: The method of aspect 20, wherein a first periodicity of the first subset of resources is different from a second periodicity of the second subset of resources.

Aspect 22: The method of any of aspects 1 through 21, wherein the transmitting the random access message further comprises transmitting one or more further random access messages over the satellite link according to a configuration for periodic contention-free random access preamble message transmissions.

Aspect 23: The method of aspect 22, wherein the configuration for periodic contention-free random access preamble message transmissions is received from the base station in radio resource control signaling.

Aspect 24: The method of aspect 23, wherein the configuration for periodic contention-free random access preamble message transmissions is activated based at least in part on activation signaling received in one or more of a medium access control (MAC) control element or a downlink control information communication from the base station.

Aspect 25: The method of aspect 24, wherein the activation signaling includes information for adjustment of one or more parameters associated with the one or more further random access messages.

Aspect 26: The method of any of aspects 1 through 25, further comprising: receiving, from the base station, in response to the random access message, a physical layer downlink control information communication that provides one or more of a time or frequency correction command for communications via the satellite link.

Aspect 27: The method of aspect 26, wherein the time or frequency correction command is provided in the physical layer downlink control information when an indicated correction value is less than a threshold value, and wherein the time or frequency correction command is provided in a medium access control (MAC) control element when the indicated correction value meets or exceeds the threshold value.

Aspect 28: The method of any of aspects 1 through 27, wherein the first set of narrowband random access parameters supports different random access resource configurations associated with one or more repetitions of a preamble repetition unit (PRU) than the second set of narrowband random access parameters.

Aspect 29: The method of aspect 28, wherein a maximum number of preamble repetitions supported by the first set of narrowband random access parameters is less than the maximum number of preamble repetitions supported by the second set of narrowband random access parameters for at least a subset of random access preamble configurations.

Aspect 30: A method for wireless communication at a base station, comprising: transmitting, to a UE, configuration information for a first set of narrowband random access parameters corresponding to random access messages transmitted over a non-terrestrial network that is different from a second set of narrowband random access parameters for random access messages transmitted over a terrestrial network; detecting one or more random access messages from the UE via a satellite link of the non-terrestrial network based at least in part on the first set of narrowband random access parameters; and transmitting a random access response to the UE via the satellite link responsive to the detecting.

Aspect 31: The method of aspect 30, wherein the first set of narrowband random access parameters include a first set of starting subcarriers allocated for contention-based random access preambles and is different from a second set of starting subcarriers allocated for contention-based random access preambles in the second set of narrowband random access parameters.

Aspect 32: The method of aspect 31, wherein adjacent starting subcarriers of the first set of starting subcarriers have a first frequency spacing that is larger than a second frequency spacing between adjacent starting subcarriers of the second set of starting subcarriers.

Aspect 33: The method of any of aspects 31 through 32, wherein the first set of starting subcarriers allocated for contention-based random access preambles has fewer available starting subcarriers per unit of frequency than the second set of starting subcarriers.

Aspect 34: The method of any of aspects 31 through 33, wherein the first set of starting subcarriers has a different range of starting subcarriers within a total number of available starting subcarriers for contention-based random access and contention-free random access than that of the second set of starting subcarriers.

Aspect 35: The method of any of aspects 31 through 34, wherein the first set of starting subcarriers corresponds to a subset of the second set of starting subcarriers.

Aspect 36: The method of aspect 35, wherein the first set of starting subcarriers are selected from the second set of starting subcarriers based at least in part on one or more of a starting subcarrier index value or a pattern of starting subcarriers from the second set of starting subcarriers.

Aspect 37: The method of aspect 31, wherein the first set of starting subcarriers allocated for contention-based random access corresponds to a subset of a total number of available starting subcarriers allocated for contention-based and contention-free random access preambles in the second set of narrowband random access parameters, the first set of starting subcarriers is determined at least in part by a pattern of starting subcarriers from the second set of starting subcarriers.

Aspect 38: The method of aspect 30, wherein the first set of narrowband random access parameters include a first set of random access preambles for contention-based random access that have one or more different characteristics than a second set of random access preambles of the second set of narrowband random access parameters.

Aspect 39: The method of aspect 38, wherein the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles.

Aspect 40: The method of aspect 39, wherein at least one intra-PRU hopping pattern provides that two random access preambles that are adjacent in frequency in a first portion of the PRU are non-adjacent in frequency in a second part of the PRU.

Aspect 41: The method of any of aspects 38 through 40, wherein the first set of random access preambles are configured from a first candidate set of random access preambles and the second set of random access preambles are configured from a second candidate set of random access preambles, the first candidate set of preambles is a subset of the second candidate set of random access preambles.

Aspect 42: The method of aspect 41, wherein one or more preamble formats, preamble subcarrier spacings, or any combinations thereof of the second candidate set of random access preambles are precluded from the first candidate set of random access preambles.

Aspect 43: The method of any of aspects 30 through 42, wherein the transmitting the configuration information further comprises: transmitting an indication of a first subset of the first set of narrowband random access parameters that provide resources corresponding to the first subset and a second subset of the first set of narrowband random access parameters that provide resources corresponding to the second subset, wherein the resources corresponding to the first subset have one or more parameters that are different than corresponding parameters of the second subset resources.

Aspect 44: The method of aspect 43, wherein the first subset of narrowband random access parameters use random access parameters that are not different from those of terrestrial random access messages and the second subset of narrowband random access parameters use random access parameters specific to non-terrestrial random access messages.

Aspect 45: The method of aspect 44, wherein the random access parameters include one or more of a set of starting subcarrier indices, a frequency hopping pattern for random access preambles, a subcarrier spacing, a number of subcarriers spanned in frequency, or any combinations thereof.

Aspect 46: The method of any of aspects 43 through 45, wherein the resources corresponding to the first subset and the resources corresponding to the second subset are located in a same set of frequency resources and in different time resources, in different sets of frequency resources and a same set of time resources, in different frequency and time resources, or interlaced with each other within the same set of time and frequency resources.

Aspect 47: The method of any of aspects 30 through 46, wherein the receiving the random access message further comprises receiving one or more further random access messages over the satellite link according to a configuration for periodic contention-free random access message transmissions.

Aspect 48: The method of aspect 47, wherein the configuration for periodic contention-free random access resources is transmitted to the UE in radio resource control signaling and activated based at least in part on activation signaling transmitted in one or more of a medium access control (MAC) control element or a downlink control information communication from the base station.

Aspect 49: The method of aspect 48, wherein the activation signaling includes information for adjustment of one or more parameters associated with the one or more further random access messages.

Aspect 50: The method of any of aspects 30 through 49, further comprising: transmitting, to the UE, in response to the random access message, a physical layer downlink control information communication that provides one or more of a time or frequency correction command for communications via the satellite link.

Aspect 51: The method of any of aspects 30 through 50, wherein the first set of narrowband random access parameters supports different random access resource configurations associated with one or more repetitions of a preamble repetition unit (PRU) than the second set of narrowband random access parameters.

Aspect 52: The method of aspect 51, wherein a maximum number of preamble repetitions supported by the first set of narrowband random access parameters is less than the maximum number of repetitions supported by the second set of narrowband random access parameters for at least a subset of random access preamble configurations.

Aspect 53: An apparatus for wireless communication at a UE, comprising a processor; memory coupled with the processor; and instructions stored in the memory and executable by the processor to cause the apparatus to perform a method of any of aspects 1 through 29.

Aspect 54: An apparatus for wireless communication at a UE, comprising at least one means for performing a method of any of aspects 1 through 29.

Aspect 55: A non-transitory computer-readable medium storing code for wireless communication at a UE, the code comprising instructions executable by a processor to perform a method of any of aspects 1 through 29.

Aspect 56: An apparatus for wireless communication at a base station, comprising a processor; memory coupled with the processor; and instructions stored in the memory and executable by the processor to cause the apparatus to perform a method of any of aspects 30 through 52.

Aspect 57: An apparatus for wireless communication at a base station, comprising at least one means for performing a method of any of aspects 30 through 52.

Aspect 58: A non-transitory computer-readable medium storing code for wireless communication at a base station, the code comprising instructions executable by a processor to perform a method of any of aspects 30 through 52.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor,
    memory coupled with the processor; and
    instructions stored in the memory and executable by the processor to cause the apparatus to:
        receive configuration information for a first set of narrowband random access parameters corresponding to random access messages transmitted over a non-terrestrial network that is different from a second set of narrowband random access parameters for random access messages transmitted over a terrestrial network, the first set of narrowband random access parameters including a first set of starting subcarriers that is different from a second set of starting subcarriers in the second set of narrowband random access parameters;
        select, based at least in part on the configuration information, one or more narrowband random access parameters from the first set of narrowband random access parameters for a random access message to be transmitted to an access network entity via a satellite link of the non-terrestrial network; and
        transmit the random access message to the access network entity via the satellite link using the selected narrowband random access parameters.

2. The apparatus of claim 1, wherein the first set of starting subcarriers are allocated for contention-based random access preambles for the satellite link, and the second set of starting subcarriers are allocated for contention-based random access preambles in the second set of narrowband random access parameters.

3. The apparatus of claim 2, wherein adjacent starting subcarriers of the first set of starting subcarriers have a first frequency spacing that is larger than a second frequency spacing between adjacent starting subcarriers of the second set of starting subcarriers.

4. The apparatus of claim 2, wherein the first set of starting subcarriers allocated for contention-based random access preambles has fewer available starting subcarriers per unit of frequency than the second set of starting subcarriers.

5. The apparatus of claim 2, wherein the first set of starting subcarriers has a different range of starting subcarriers within a total number of available starting subcarriers for contention-based random access and contention-free random access than that of the second set of starting subcarriers.

6. The apparatus of claim 2, wherein the first set of starting subcarriers corresponds to a subset of the second set of starting subcarriers.

7. The apparatus of claim 6, wherein the first set of starting subcarriers are selected from the second set of starting subcarriers based at least in part on one or more of a starting subcarrier index value or a pattern of starting subcarriers from the second set of starting subcarriers.

8. The apparatus of claim 7, wherein the pattern of starting subcarriers comprises one out of every m consecutive starting subcarriers from the second set of starting subcarriers, where m is an integer.

9. The apparatus of claim 2, wherein the first set of starting subcarriers allocated for contention-based random access corresponds to a subset of a total number of available starting subcarriers allocated for contention-based and contention-free random access preambles in the second set of narrowband random access parameters, wherein the first set of starting subcarriers is determined at least in part by a pattern of starting subcarriers from the second set of starting subcarriers.

10. The apparatus of claim 9, wherein the pattern of starting subcarriers comprises one out of every m consecutive starting subcarriers from the total number of available starting subcarriers in the second set of narrowband random access parameters, where m is an integer.

11. The apparatus of claim 1, wherein the first set of narrowband random access parameters include a first set of random access preambles for contention-based random access that have one or more different characteristics than a second set of random access preambles of the second set of narrowband random access parameters.

12. The apparatus of claim 11, wherein the first set of random access preambles have one or more of a different intra-preamble repetition unit (PRU) frequency hopping pattern, a different inter-PRU frequency hopping pattern, a different subcarrier spacing, a different number of subcarriers spanned in frequency, or any combinations thereof, relative to the second set of random access preambles.

13. The apparatus of claim 12, wherein at least one intra-PRU hopping pattern provides that two random access preambles that are adjacent in frequency in a first portion of the PRU are non-adjacent in frequency in a second portion of the PRU.

14. The apparatus of claim 11, wherein the first set of random access preambles are configured from a first candidate set of random access preambles and the second set of random access preambles are configured from a second candidate set of random access preambles, wherein the first candidate set of random access preambles is a subset of the second candidate set of random access preambles.

15. The apparatus of claim 14, wherein one or more preamble formats, preamble subcarrier spacings, or any combinations thereof of the second candidate set of random access preambles are precluded from the first candidate set of random access preambles.

16. The apparatus of claim 1, wherein the instructions to receive the configuration information are further executable by the processor to cause the apparatus to:
receive an indication of a first subset of the first set of narrowband random access parameters that provide a first subset of resources corresponding to the first subset of narrowband random access parameters and a second subset of the first set of narrowband random access parameters that provide a second subset of resources corresponding to the second subset of narrowband random access parameters, wherein the first subset of resources have one or more parameters that are different than corresponding parameters of the second subset of resources.

17. The apparatus of claim 16, wherein the first subset of resources or the second subset of resources are any one of contention-based random access resources or contention-free random access resources.

18. The apparatus of claim 16, wherein the first subset of narrowband random access parameters use random access parameters that are not different from those of terrestrial random access messages and the second subset of narrowband random access parameters use random access parameters specific to non-terrestrial random access messages.

19. The apparatus of claim 16, wherein the narrowband random access parameters include one or more of a set of starting subcarrier indices, a frequency hopping pattern for random access preambles, a subcarrier spacing, a number of subcarriers spanned in frequency, or any combinations thereof.

20. The apparatus of claim 16, wherein the first subset of resources and the second subset of resources are located in a same set of frequency resources and in different time resources, in different sets of frequency resources and a same set of time resources, in different frequency and time resources, or interlaced with each other within the same set of time and frequency resources.

21. The apparatus of claim 20, wherein a first periodicity of the first subset of resources is different from a second periodicity of the second subset of resources.

22. The apparatus of claim 1, wherein the instructions to transmit the random access message are further executable by the processor to cause the apparatus to:
transmit one or more further random access messages over the satellite link according to a configuration for periodic contention-free random access preamble message transmissions.

23. The apparatus of claim 22, wherein the configuration for periodic contention-free random access preamble message transmissions is received from the access network entity in radio resource control signaling.

24. The apparatus of claim 23, wherein the configuration for periodic contention-free random access preamble message transmissions is activated based at least in part on activation signaling received in one or more of a medium access control (MAC) control element or a downlink control information communication from the access network entity.

25. The apparatus of claim 24, wherein the activation signaling includes information for adjustment of one or more parameters associated with the one or more further random access messages.

26. The apparatus of claim 1, wherein the instructions are further executable by the processor to cause the apparatus to:
receive in response to the random access message, a physical layer downlink control information communication that provides one or more of a time or frequency correction command for communications via the satellite link.

27. The apparatus of claim 26, wherein:
the time or frequency correction command is provided in the physical layer downlink control information when an indicated correction value is less than a threshold value, and wherein the time or frequency correction command is provided in a medium access control (MAC) control element when the indicated correction value meets or exceeds the threshold value.

28. The apparatus of claim 1, wherein the first set of narrowband random access parameters supports different random access resource configurations associated with one or more repetitions of a preamble repetition unit (PRU) than the second set of narrowband random access parameters.

29. The apparatus of claim 28, wherein a maximum number of preamble repetitions supported by the first set of narrowband random access parameters is less than the maximum number of preamble repetitions supported by the second set of narrowband random access parameters for at least a subset of random access preamble configurations.

30. An apparatus for wireless communication at an access network entity, comprising:
a processor;
memory coupled with the processor; and
instructions stored in the memory and executable by the processor to cause the apparatus to:
transmit, to a user equipment (UE), configuration information for a first set of narrowband random access parameters corresponding to random access messages transmitted over a non-terrestrial network that is different from a second set of narrowband random access parameters for random access messages transmitted over a terrestrial network, the first set of narrowband random access parameters including a first set of starting subcarriers that is different from a second set of starting subcarriers in the second set of narrowband random access parameters;
detect one or more random access messages from the UE via a satellite link of the non-terrestrial network based at least in part on the first set of narrowband random access parameters; and
transmit a random access response to the UE via the satellite link responsive to the one or more random access messages.

* * * * *